US010528801B2

(12) United States Patent
Arbatman et al.

(10) Patent No.: US 10,528,801 B2
(45) Date of Patent: Jan. 7, 2020

(54) METHOD AND SYSTEM FOR INCORPORATING CONTEXTUAL AND EMOTIONAL VISUALIZATION INTO ELECTRONIC COMMUNICATIONS

(71) Applicant: Keyterra LLC, Mountain View, CA (US)

(72) Inventors: Leonid Arbatman, Mountain View, CA (US); Viacheslav Iushchenko, Kiev (UA)

(73) Assignee: Keyterra LLC, Mountain View, CA (US)

( * ) Notice: Subject to any disclaimer, the term of this patent is extended or adjusted under 35 U.S.C. 154(b) by 19 days.

(21) Appl. No.: 15/834,999

(22) Filed: Dec. 7, 2017

(65) Prior Publication Data

US 2018/0157901 A1 Jun. 7, 2018

Related U.S. Application Data

(60) Provisional application No. 62/431,250, filed on Dec. 7, 2016.

(51) Int. Cl.
*G06K 9/00* (2006.01)
*G06T 13/80* (2011.01)
(Continued)

(52) U.S. Cl.
CPC ..... *G06K 9/00315* (2013.01); *G06K 9/00268* (2013.01); *G06T 13/40* (2013.01); (Continued)

(58) Field of Classification Search
CPC ......... G06T 17/20; G06T 13/40; G06T 13/80; G06T 19/20; G06T 15/04; G06T 13/20; (Continued)

(56) References Cited

U.S. PATENT DOCUMENTS

2013/0121409 A1* 5/2013 Bourdev ............ G06K 9/00208 375/240.08
2015/0042743 A1 2/2015 Cullen
(Continued)

OTHER PUBLICATIONS

A survey on face modeling: building a bridge between face analysis and synthesis. The Visual Computer 34.2 (2018): 289-319, published online Nov. 18, 2016 (Year: 2016).*

*Primary Examiner* — Xiao M Wu
*Assistant Examiner* — Scott E Sonners
(74) *Attorney, Agent, or Firm* — Lowenstein Sandler LLP

(57) ABSTRACT

A computer-implemented method and system for incorporating emotional and contextual visualization into an electronic communication, comprises: creating a 2D texture map of a user's face from a series of photos; comparing user's 2D texture map with 2D texture maps of the samples from a reference database to find the closest matches and create a photorealistic composite 3D mesh model of the user's head that can be modified to present different emotions and phonemes; during an electronic communication between a sending device of the user and the receive device, determining an emotional state and a current phoneme (viseme) through user's voice, text or data from the camera and transmitting an emotional identifier and a phoneme identifier to the receiving devise; using emotion ID and phoneme ID to retrieve from the databases, loaded on receiving device, corresponding 3D mesh models and corresponding 2D textures to create and display a fully animated video message on the receiving devise without requiring video data transmission via the communication channel.

18 Claims, 42 Drawing Sheets

401 - Receive photo (image) _132-210
↓
402 - Create 2D texture_210
↓
403 -- Apply a uniform 2D texture map aligned with uniform 3D mesh model having standardized layout of polygons and vertices _211
↓
404 - Generate face markers (mapping, authentication, emotion, phoneme)_212
↓
405 - Compare coordinates of authentication markers with the corresponding coordinates of the DB samples_214-222
↓
406 - Determine match for each authentication marker_214-222
↓
407 - Combine all matches to generate composite 3D mesh of Personal Double_220
↓
408 - Mapping 2D texture on Compose 3D mesh_210-220
↓
409 - Add accessories chosen by the user_155-220
↓
410 - Create Personal Double (PD) and store it_220-224
↓
411 - Combine integral parts of the user's PD and from the chosen Avatar_165-224-232
↓
412 - Create Avatar Double (AD) and store it_230-234
↓
413 - Adding a new sample to the existing DB_224-222 (self-learning system)

(51) Int. Cl.
*G06T 13/40* (2011.01)
*G06T 17/20* (2006.01)
*H04L 12/58* (2006.01)
*H04L 12/18* (2006.01)

(52) U.S. Cl.
CPC .............. *G06T 13/80* (2013.01); *G06T 17/20* (2013.01); *H04L 12/1827* (2013.01); *H04L 51/10* (2013.01)

(58) Field of Classification Search
CPC ........... G06T 2207/30201; G06T 19/00; G06T 2200/08; G06T 7/75; G06T 11/001; G06T 2200/04; G06T 7/74; G06T 2219/2004; G06T 2207/10016; G06T 2219/024; G06T 7/40; G06T 7/60; G06T 7/70; G06T 11/00; G06T 11/40; G06T 13/00; G06K 9/00268; G06K 9/00288; G06K 9/00228; G06K 9/00255; G06K 9/00281; G06K 9/00248; G06K 9/00315; G06K 9/00208; G06K 9/00261; G06K 9/6209; G06F 3/012; G06F 3/011; H04L 29/06176; A63F 13/655; A63F 2300/5553
See application file for complete search history.

(56) References Cited

U.S. PATENT DOCUMENTS

| | | | | |
|---|---|---|---|---|
| 2015/0084950 | A1* | 3/2015 | Li | G06T 7/251<br>345/419 |
| 2016/0148425 | A1* | 5/2016 | Hwang | G06K 9/00281<br>345/419 |
| 2017/0154461 | A1* | 6/2017 | Rhee | G06T 15/04 |
| 2018/0158230 | A1* | 6/2018 | Yan | G06K 9/00268 |

* cited by examiner

USER FACE 3D MODEL CREATION

SYNTHESING 3D MESH MODEL AND PERSONAL DOUBLE

CREATING AVATAR VISUAL INTELLIGENT DOUBLE - AVID (AD)

3D animated avatar gallery

CREATING AVATAR VISUAL INTELLIGENT DOUBLE (AD)

FIG. 4

EMOTION RECOGNITION

FIG. 6

GENERATING MARKERS IN FACIAL EMOTION AND PHONEME RECOGNITION

PD (AD) ACTIVATION – TOOLS & SOURCES

Texting

Emotion Manual Settings

Choose avatar (AD)

Visual Intelligent Double (VID) Chat

Jennifer

Nikita

John

FIG. 11

Choose your avatar VID as a game character

Play with the maximum immersion using your unique avatar VID

FIG. 12

P1, P2, ... Pm m - constant

V1, V2, ... Vn n - constant

STANDARDIZED POLYGON-VERTEX FACE MESH

Generating Marker GMκ:

2D texture Uκ = 534.96 Vκ = 738.21

3D mesh Xκ = 534.96 Yκ = 738.21 Zκ = 123.76

Set of predefined phonemes:
p1, p2...pm...pn...pP
p=(1...P)
ADP - Avatar Double Phoneme

METHOD AND SYSTEM FOR INCORPORATING CONTEXTUAL AND EMOTIONAL VISUALIZATION INTO ELECTRONIC COMMUNICATIONS

RELATED APPLICATIONS

This application claims the benefit of U.S. Provisional Application No. 62/431,250, filed Dec. 7, 2016, the entire contents of which are hereby incorporated by reference herein.

BRIEF SUMMARY

The exemplary embodiment provides methods and systems for incorporating contextual and emotional visualization into an electronic communication. Aspects of an exemplary embodiment include creating a 2D texture map of a user's face from a series of photos and mapping the 2D texture map over a 3D mesh model of the user's head to create a personal double; loading onto a receiving device, the user's personal double and one or more user databases of 3D mesh models and corresponding 2D texture templates expressing different emotions and phonemes; during an electronic communication between a sending device of the user and the receiving device, determining an emotional state and pronouncing phoneme through at least one of the user's face, voice or typing pattern and transmitting a corresponding emotion identifier and phoneme identifier to the receiving device; using the emotion ID and phoneme ID to retrieve corresponding 3D mesh model templates from the user databases, and implementing blending between the retrieved 3D mesh model templates to create and display a fully animated video message on the receiving device.

According to the method and system disclosed herein, the exemplary embodiment requires no video data transmission during the communication session, and the user sees smooth and uninterrupted visual moving patterns even in the mode of multi-user conference or in other bandwidth constrained environments. Thus, the communication channels are used to transmit only voice 010, text 020 and data 030.

BRIEF DESCRIPTION OF SEVERAL VIEWS OF THE DRAWINGS

FIG. 4 is a diagram illustrating example avatar doubles (ADs) generated by composing integral parts from the user's personal double (PD) with various integral parts of the avatar templates.

FIG. 6 is a diagram showing a set of predefined emotions where each unit comprises a unique 3D mesh model and a corresponding 2D texture map.

FIG. 11 is a diagram showing examples of how various avatar doubles could appear.

FIG. 12 is a diagram illustrating that the visualization application can be used to create unique AD game characters that are inserted into video games for maximum immersion.

DETAILED DESCRIPTION

Figure 1:
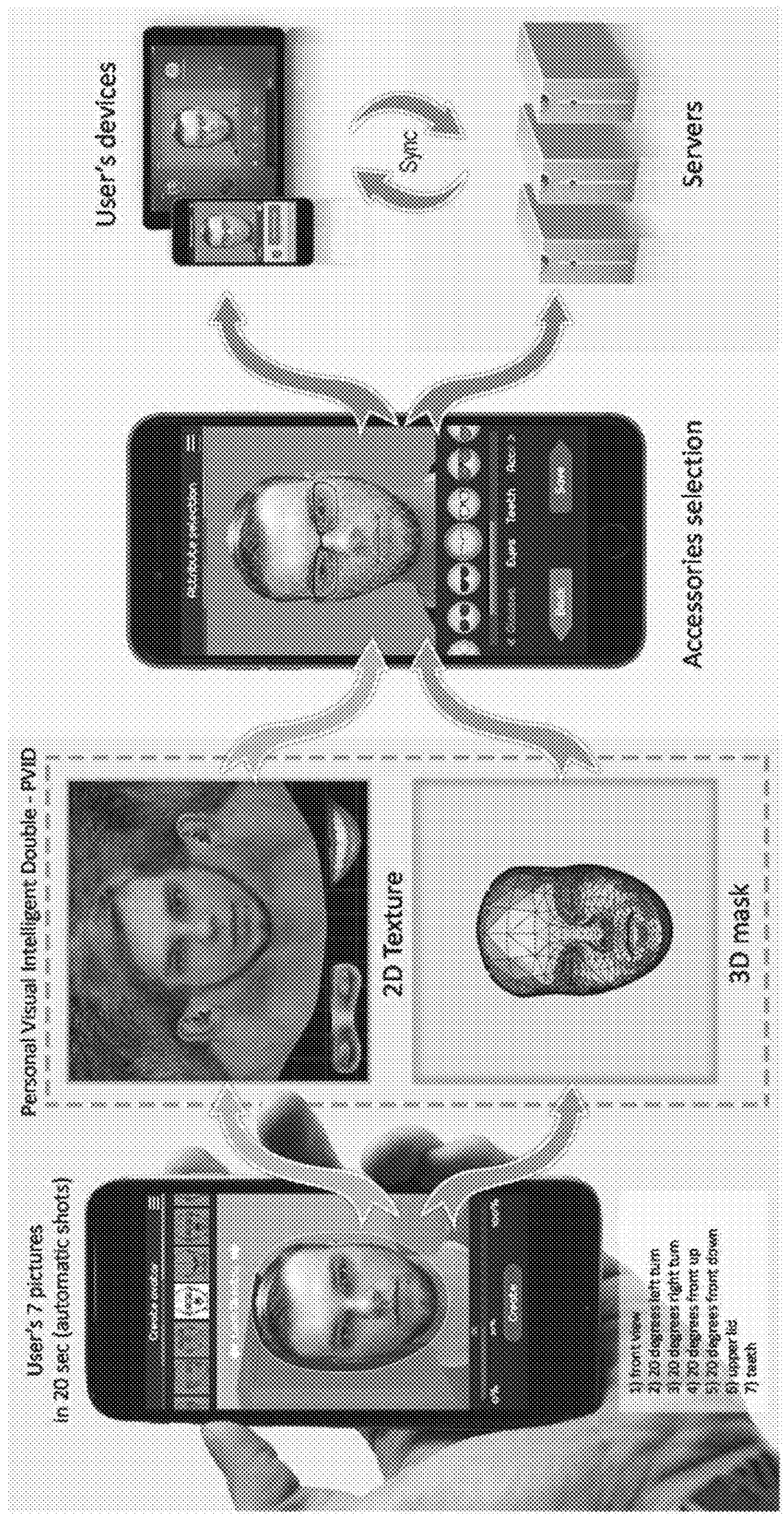
FIG. 1 is a diagram illustrating one embodiment of the process for creating the user's face model.

The exemplary embodiment relates to methods and systems for incorporating contextual and emotional visualization into electronic communications. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as “exemplary embodiment”, “one embodiment” and “another embodiment” may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for incorporating contextual and emotional visualization into electronic communications, and methods and systems for constructing a visual communication channel. According to the exemplary embodiment, converter (210, FIG. 33) receives a series of photos (e.g., from camera 112 of the sender device 100, creates a 2D texture map of a user (e.g., the face) (401-402, FIG. 37) and maps the 2D texture map over a 3D mesh model of the user’s face (408, FIG. 37) to create a personal double (PD) stored in a database (224 DB, FIG. 33). One or more databases of 3D mesh model templates comprising neutral faces, emotions and phonemes are created (222 DB, FIG. 33) so that the PD can be modified to express any number of preset emotions (see examples in FIG. 6) and any number of preset phonemes. Optionally, the user may select to have a hybrid avatar designer (165, FIG. 33) merge aspects of the PD with aspects of a 3D model of a selected avatar to create an avatar double (AD)—234 DB. The sender’s PD or AD can be chosen for the current communication session and the user databases containing 3D mesh model templates expressing different emotions and/or phonemes can be preloaded and stored on the receiver device (150 DB_K, 160 DB_K, FIG. 36).

During any electronic communication (e.g., text, email, voice, video, etc.) between the user and a recipient, the system periodically recognizes the user’s emotions and/or phonemes from the user’s voice, text and/or face (701, 705, FIG. 40), and transmits the electronic communication and an emotion ID corresponding to the recognized emotion and a phoneme ID corresponding to the recognized phoneme to the receiving device (703, 707, FIG. 40)—320, 330. Upon receipt at the recipient device, the emotion ID and phoneme ID are used to retrieve corresponding 3D mesh models from the preloaded user databases (709, FIG. 40), and these retrieved 3D meshes are used as a sequence of base images (360, FIGS. 36 & 710, FIG. 40) while transitional frames are provided by blending process (370, FIGS. 36 & 711, FIG. 40). A final synchronization process may combine the voice, text and the visual images of the PD or AD, to create and display a fully animated video message, complete with transitions (380, FIGS. 36 & 712, FIG. 40).

FIG. 1 is a diagram illustrating one embodiment of the process for creating a 3D model of the user’s face. To begin incorporating contextual and emotional visualization into electronic communications, we must first create his/her 2D texture and 3D mesh model; 3D mesh with 2D texture mapped on it, is referred to as a personal image or personal double (PD). This may be accomplished by opening a visualization application on the user’s mobile device that prompts the user to take a series of photos (e.g., 5-7, at least 1) of him or herself. The application then creates a facial 2D texture map from the photos. In another embodiment, photos may be taken of more than the user’s head, such as the user’s torso or even the entire body, along with generation of corresponding 2D texture maps.

Integral parts of the 2D texture map are used to search a corpus of faces database comprising a plurality 2D texture map templates and 3D mesh model templates of various types of faces belonging to different groups of respondents. The corpus of faces databases is stored on a server. The user’s 2D texture map is mapped over the closest matching 3D mesh model to generate the user’s 3D mesh model or personal double (PD). Optionally, the application may display the PD and show optional accessories (e.g., glasses, hats, hair) for the user to select and have applied to the PD (155). The PD is then stored on the server and on the user’s mobile device.

The explanation below describes the implementation for synthesizing the 3D mesh model with emotions and phonemes via the application executing on the user’s device.

Figure 2:
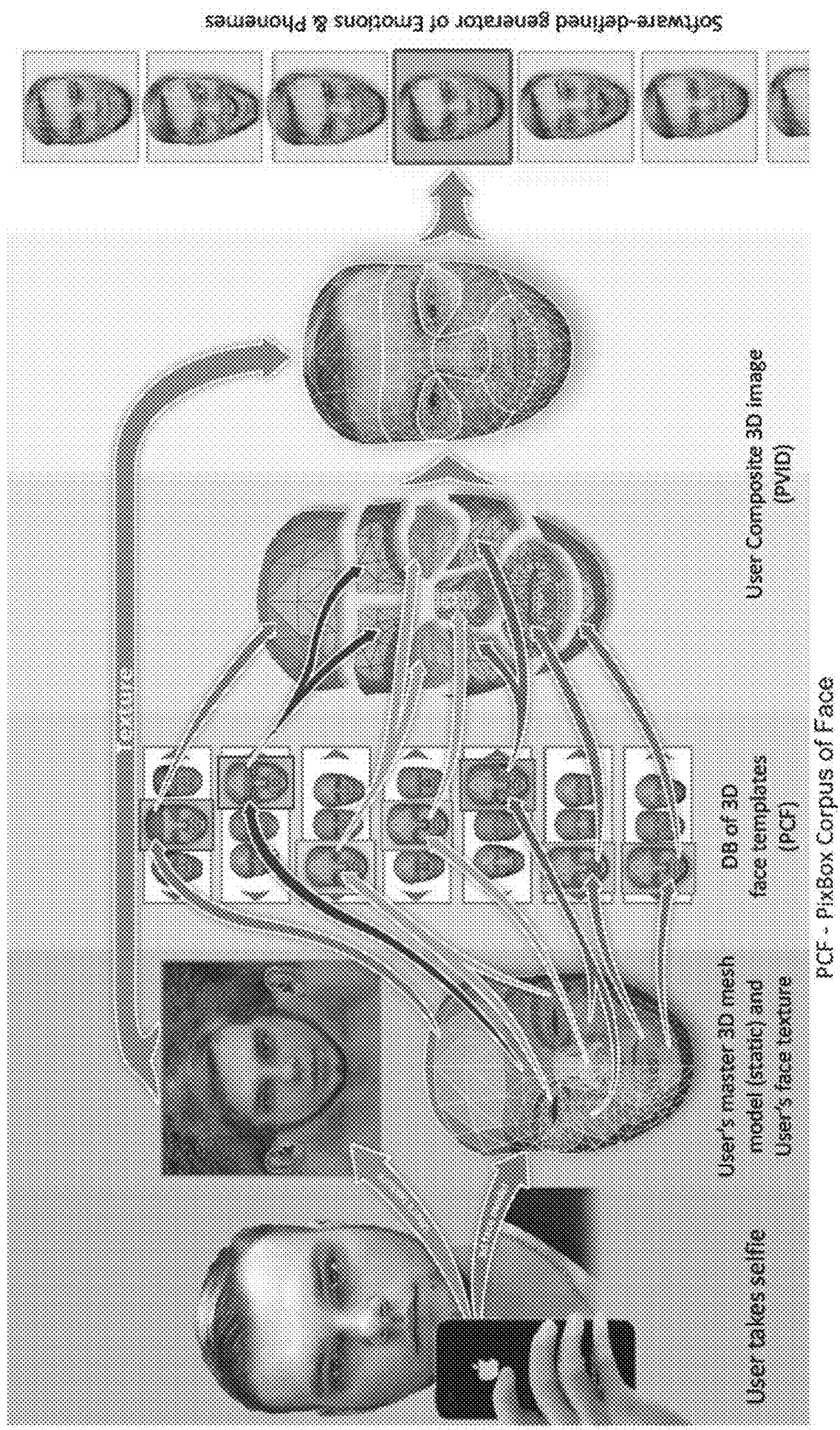
FIG. 2 is a block diagram illustrating the process for synthesizing the 3D mesh model.

FIG. 2 is a block diagram illustrating the process for synthesizing the 3D mesh model in further detail. After using the series of photos of the user to develop a 2D texture map, the process divides the user’s 2D texture map into a plurality of integral parts and compares each of the integral parts with corresponding integral parts from all of the 2D texture map templates from the corpus of faces database. The closest matching integral parts from the 2D texture map templates are determined and the corresponding integral parts of the respective 3D mesh model templates are found; then these closest matching integral parts of 3D mesh model templates from database are used to assemble the user's composite 3D mesh model. Finally, the 2D texture map is mapped onto the composite 3D mesh model to create the user's composite photorealistic 3D image, referred to as a personal visual intelligent double (PVID), or personal double (PD) for short. The PD can be subsequently modified to express any of the 50 preset emotions or 30 preset phonemes.

Figure 3:
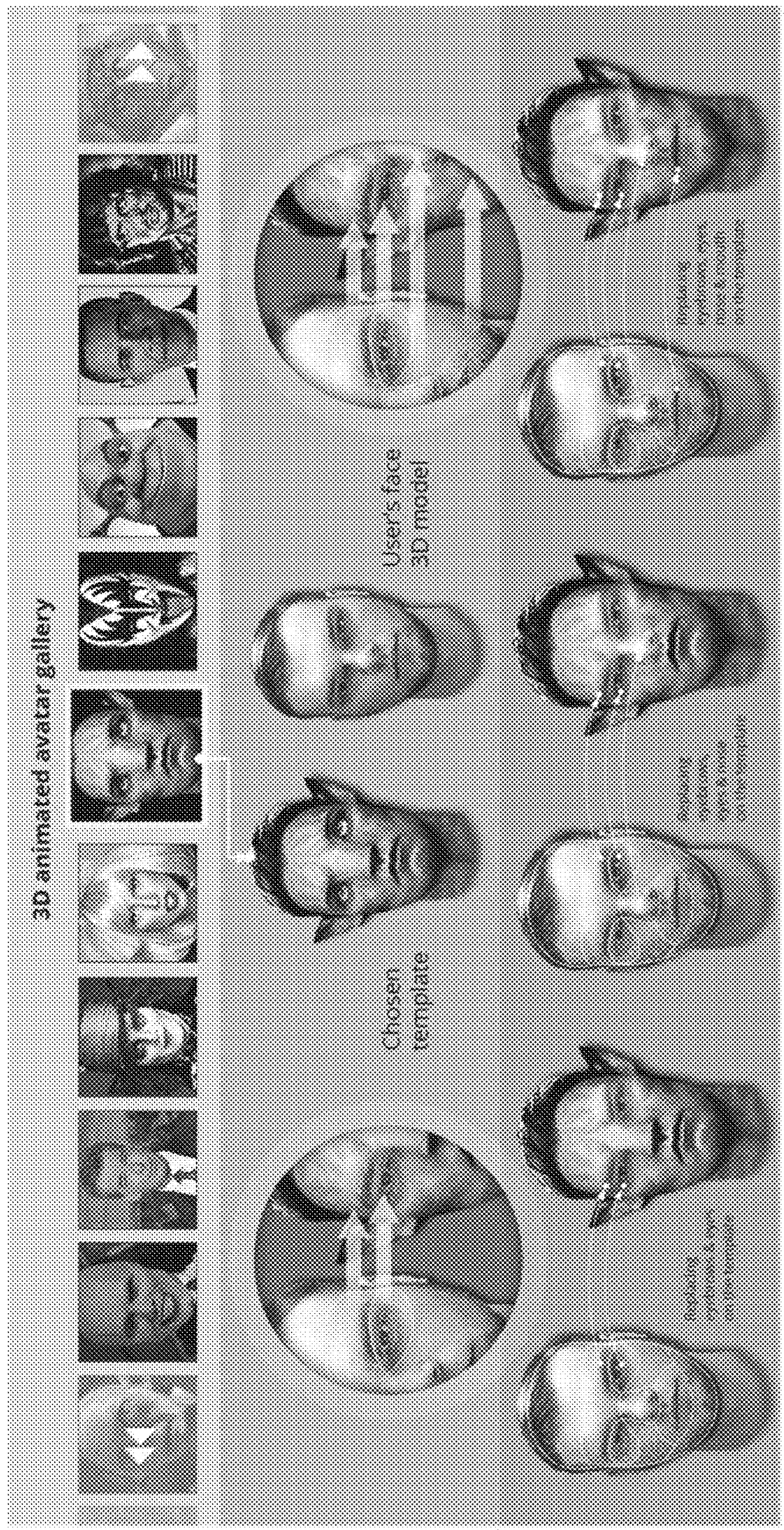
FIG. 3 is a block diagram illustrating a process for creating a hybrid avatar.
Figure 4:
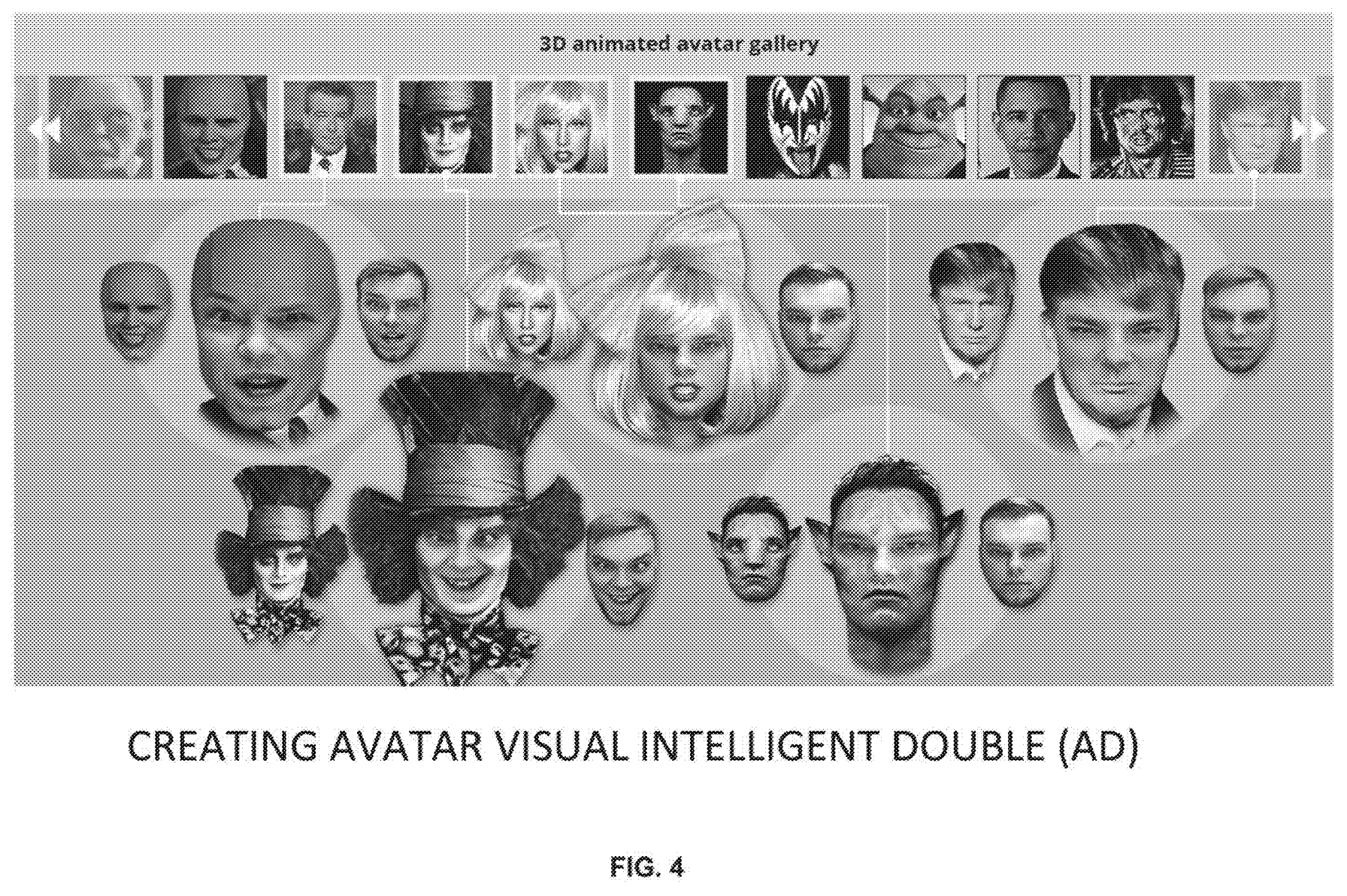

FIG. 3 is a block diagram illustrating a process for creating an avatar. The application may display a gallery of avatar template images for user selection to be his/her alter ego during the electronic communication. In one embodiment, the avatar images may be animated. The application may display the chosen avatar template alongside the user's personal double (PD). The user may then select integral parts from the PD as replacements for corresponding integral parts on the chosen avatar template. In the example shown, the user has selected eyebrows, eyes and nose from his PD to replace the eyebrows, eyes and nose on the avatar. In one embodiment, the user may select up approximately 5 to 10 integral parts from the PD. The selected integral parts from the PD are used to replace those on the avatar template to create a new composite avatar 3D image, referred to as an avatar visual intelligent double (AVID), or avatar double (AD) for short. FIG. 4 is a diagram illustrating example ADs generated by composing integral parts from the user's PD with various integral parts of the avatar template.

The exemplary processes for creating the PD and AD provide several advantages over what is currently done in the industry. First, because the user can pick and choose which integral parts to combine with those on the avatar template, the result is a hybrid (user+avatar) full-fledged 3D mesh and 2D texture mask. Creation of such a hybrid mask is different than mixing the user texture map and an avatar texture map and synchronizing their changes in real time, as currently done in the industry, and the present method has significantly improved quality of visual moving patterns and provides user with more options to customize his visual alter ego.

The second advantage is that existing systems of face tracking require the camera of the user's device to be on and continuously feeding images to the system. Generally, these systems define the coordinates of the user's facial markers at every sampling instant, substitute the parts of user's 2D texture with the respective parts of the avatar 2D texture mapped on the avatar 3D mesh, and thus providing a sequence of images/frames of a live user mask.

In contrast, once the PD has been made, the present system does not require the use of a camera during the electronic communication. Thus no video needs to be transmitted to the receiving device, thus saving bandwidth. This means the user can still use the system to display an image of him or herself to the receiver while specifying and amplifying certain emotions, even if the user does not want to pose in front of a camera or current conditions do not allow the use of the camera. The system also allows the user to control his visual alter ego using voice or text messages rather than relying on video. Another advantage is that the present system enables the user's text or speech to be spoken out by his visual alter ego in specified emotional states, as explained below. Both the users PD and AD are fully functional in all the scenarios.

FIGS. 5-9 are diagram illustrating a process for recognizing the emotional state of the user during the electronic communication. Communications over traditional messaging platforms may have a strong emotional impact on users. However, communications sent digitally (e.g., text messages) can sometimes be colorless and sterile. Facial expressions are a universal language of human emotions. To define an emotional state by analyzing a face image has been a challenge for years. Nowadays, this task is even more pressing since face-to-face communications are widely used on modern devices.

Figure 5:
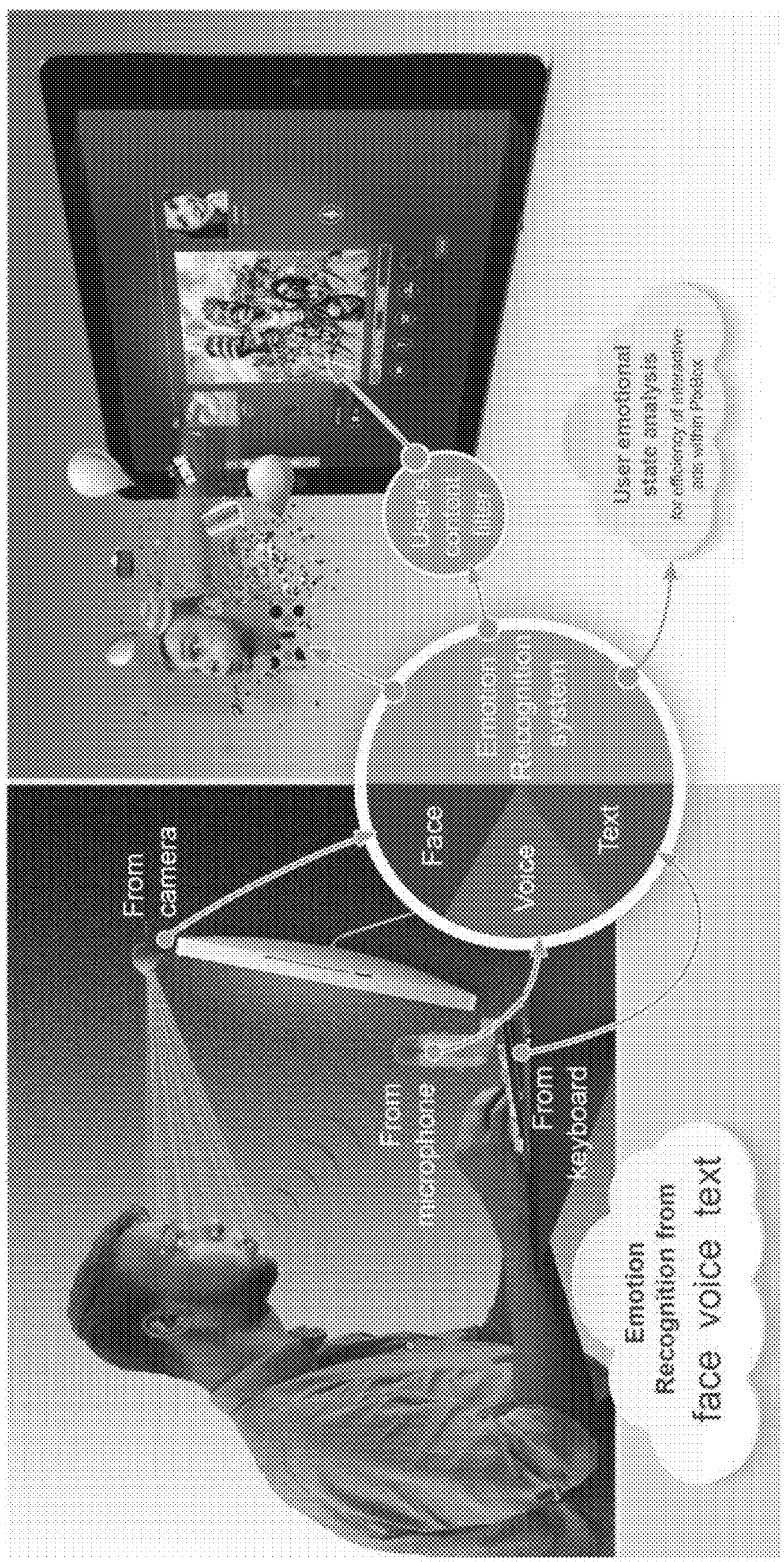
FIG. 5 is a picture showing the sources of recognizing the emotional state of the user during the electronic communication.

FIG. 5 is a diagram showing sources of information from which user's emotions and phonemes are determined. According to one aspect of the exemplary embodiments, the system includes an emotion identification module (170) that detects and relays the user's emotion to the recipient via the user's AD or PD during the electronic communication session. Accordingly, the emotion identification module ensures that the recipient is shown what the user is trying to emphasize, how the user looks during the communication, and even how the user feels.

In one embodiment, the emotion identification module able to recognize user's emotions through at least one of three possible sources of information; face images captured by a camera, voice or speech from a microphone, and text typed in from a keyboard. Depending on the circumstances or according to user presets, there might be only one or two sources of emotional information available or prevailing, and the emotion identification module may recognize emotion at different points of time from the sources, producing a complex output signal. This output signal is processed and a particular emotion is detected at every sampling instant and used to modify the user's PD/AD to express any of the preset emotions and/or preset phonemes. Other visual accessories may be displayed on or around the PD/AD to help convey the current emotion. In the example shown, assume the user is conveying birthday wishes to the recipient, in which case the user's PD/AD is displayed on the recipient device with items such as confetti, balloons, cakes, a silly hat, and a noisemaker, for instance.

One benefit to this approach is that the use of the emotion identification module and modification of the users PD/AD to express emotions and phonemes in real time greatly reduces media complaints about how mobile devices, social media and messengers in general have degraded the quality of conversations between people. Use of the emotion identification module is a significant improvement to any interactive communication channel.

Figure 6:
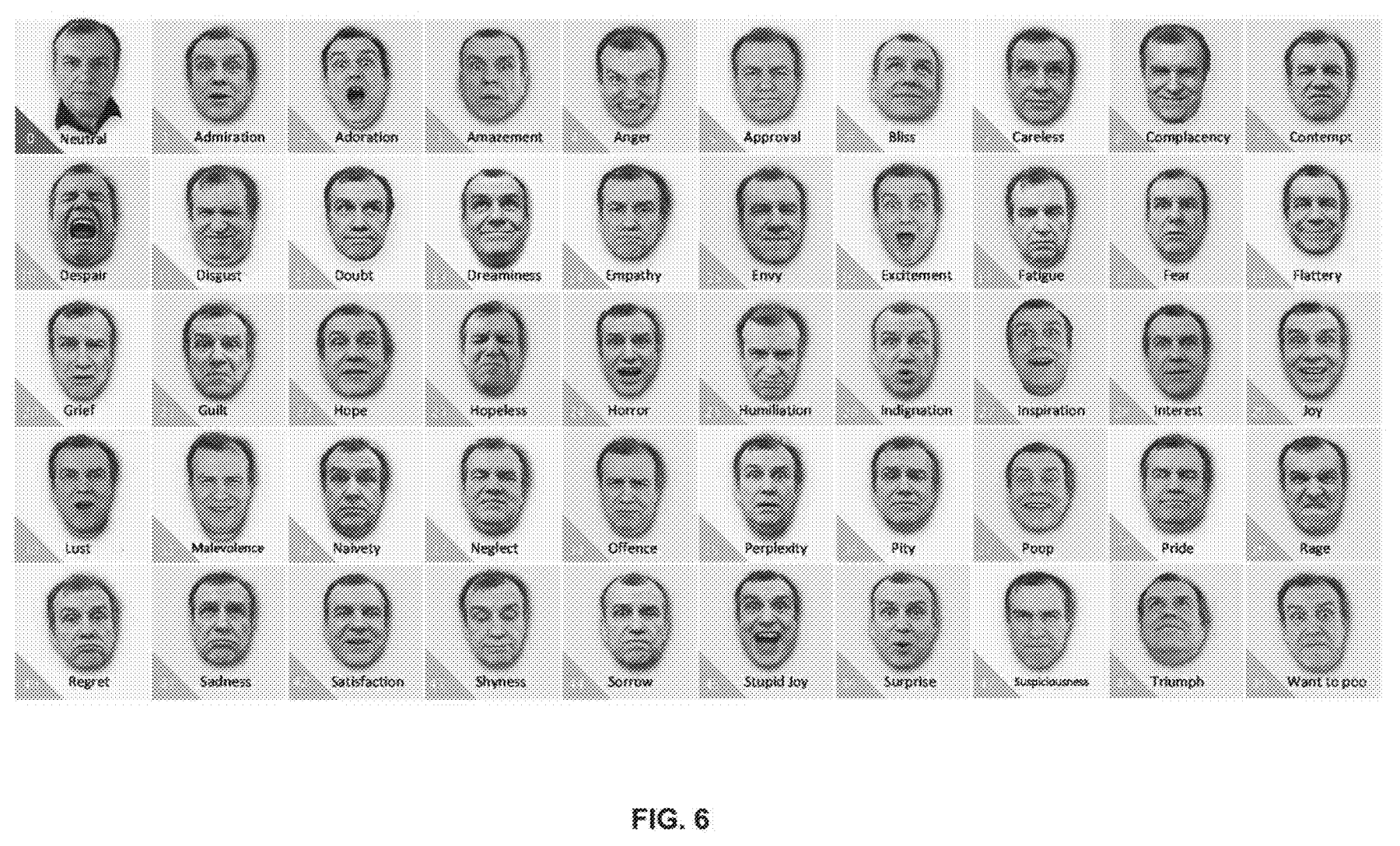

FIG. 6 is a diagram showing a set of predefined emotion units, where each unit comprises a unique 3D mesh model and a corresponding 2D texture map. The corpus of emotions database may be stored on the user's device and/or on the server. Once the emotion identification module identifies a particular emotion, using, for example, the name of the emotion ID, the corresponding 3D mesh model template from the corpus of emotions database is selected. The corpus of emotions database is used to create a fully functional visual representation of the user's face using data from preloaded photos and from the user's camera. To compromise between the size of the data and sufficient accuracy, in one embodiment, the corpus of motions database may comprise approximately 30 (thirty) base 3D mesh model templates and approximately 20 (twenty) optional 3D mesh model templates. Operating with such a unique corpus of human emotions allows smooth and natural visual moving patterns. In one embodiment, the process animates a visual image that reproduces a whole spectrum of emotions and respective transitional frames and includes facial movements imitating/representing speech.

Figure 7:
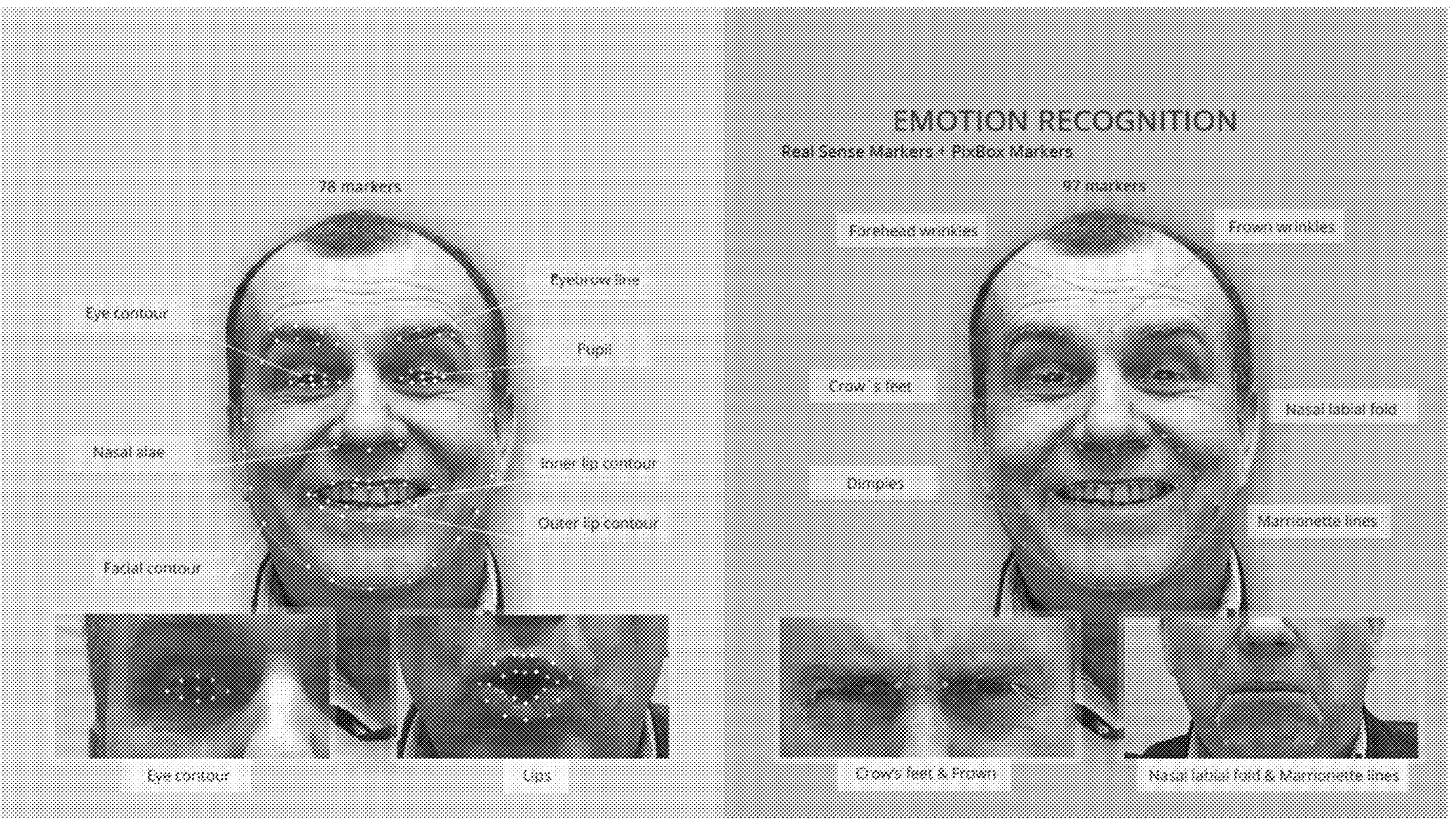
FIG. 7 is a diagram illustrating the process of facial emotion and phoneme recognition in further detail, including generating markers.

FIG. 7 is a diagram illustrating the process of facial emotion recognition in further detail, including the generation of markers. In one embodiment, the process begins by processing the image of the user and generating a plurality of markers—specific points on the user's face. As an example, images processed by a RealSense camera by Intel Corporation™ offers a base set of 78 facial markers to for use by any application. The left-hand side of FIG. 7 shows that the RealSense camera is capable of generating up to 78 markers.

The present embodiment of the visualization system elaborates on this set of facial markers to provide additional markers, which aid in the emotion recognition. The right-hand side of FIG. 7 shows that the visualization system identifies 97 facial markers from a user's image in one embodiment, adding markers for forehead wrinkles, frown wrinkles, crow's feet, nasal labial fold, temples, and marionette lines. This approach provides capability to distinguish a sufficiently larger number of emotions, which is needed to fully animate the user's personality.

Figure 8:
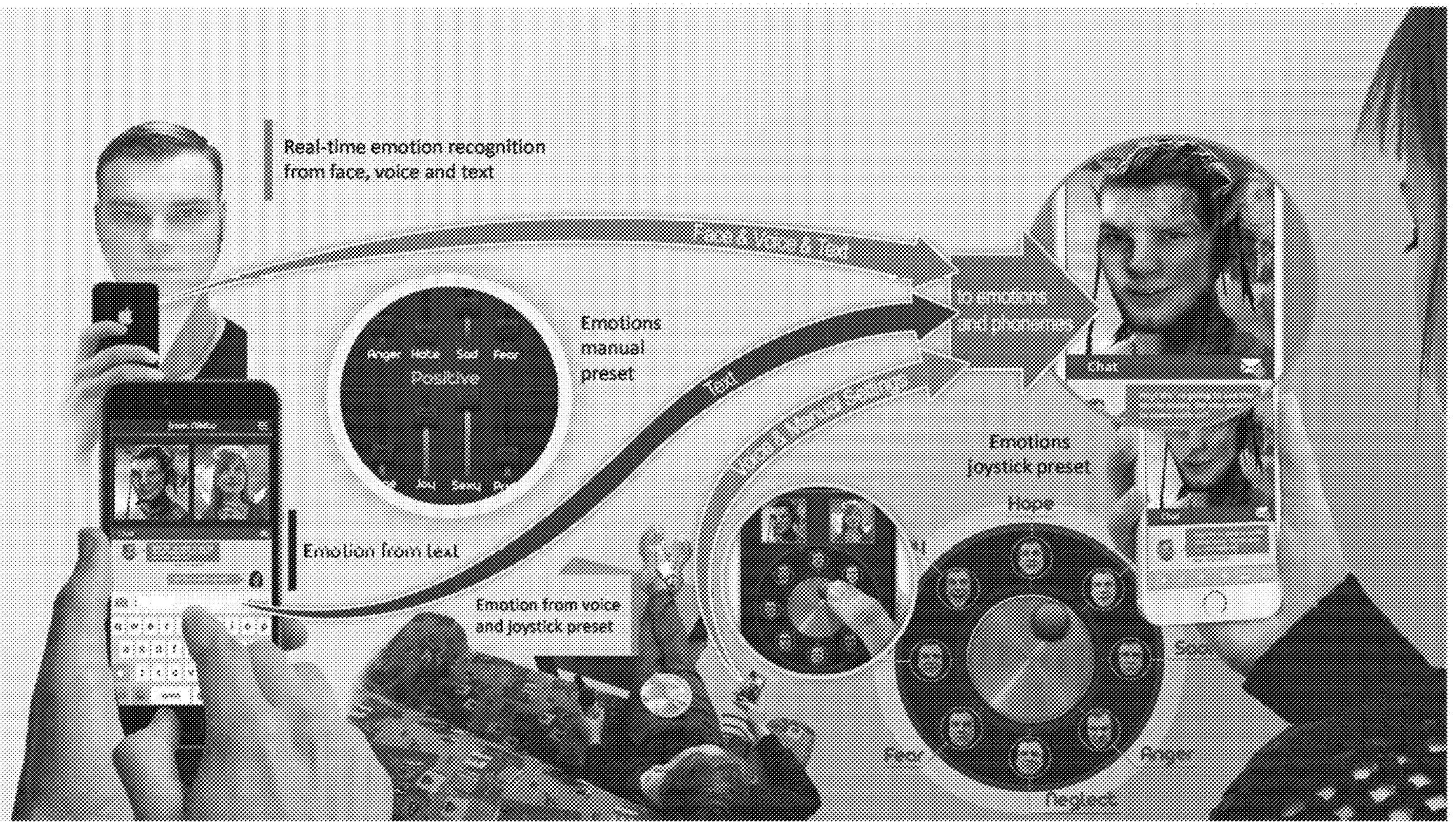
FIG. 8 is a diagram illustrating an exemplary user interface for enabling the user to bring to life his/her own alter ego in the form of the PD or AD in the course of daily communications.

FIG. 8 is a diagram illustrating an exemplary user interface for enabling the user to bring to life his/her own alter ego in the form of the PD or AD in the course of daily communications. In this example, a messaging app executed on the user's device is shown in which the user may choose whether emotions and phonemes are determined automatically by the application in real time from face, voice and/or text, from text-only, or manually preselected by the user via an emotion slider tool or joystick preset. On receiving device, the user's AD is shown reflecting the emotions and phonemes conveyed during the text session.

Figure 9:
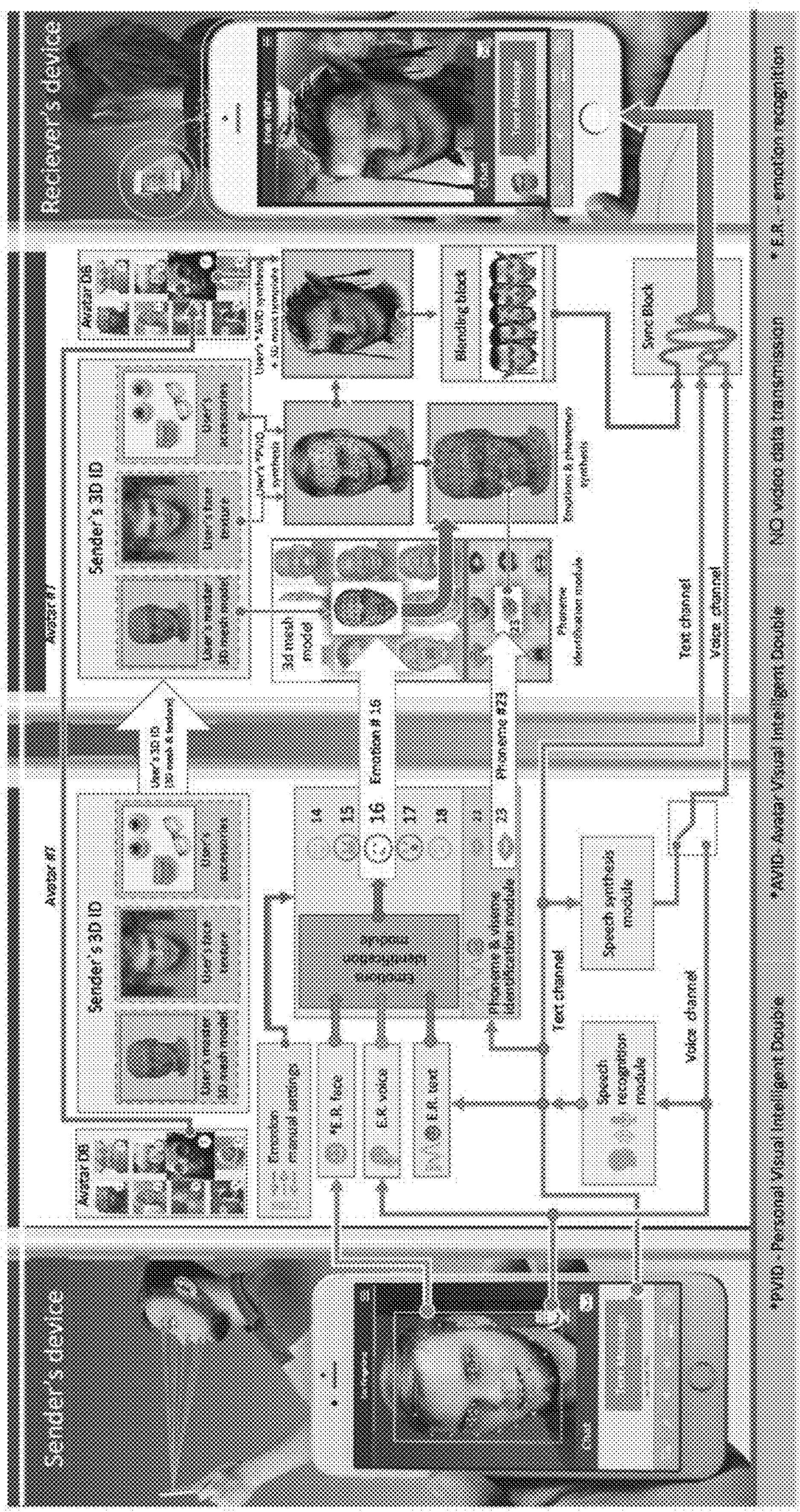
FIG. 9 is a system and logic diagram illustrating the process of PD and AD creating, transmitting and synthesizing that are implemented according to one embodiment.

FIG. 9 is a system and logic diagram illustrating one embodiment for PD/AD synthesis. First, the visualization application is loaded onto the user/senders device, including a corpus of faces database comprising 3D mesh models of various types of faces belonging to different groups of respondents. During a configuration phase, the user begins the process of creating his/her PD by taking pictures of the user's face, and the application creates the 2D texture map and compares integral parts from the 2D texture map to 2D texture map templates in the corpus of faces database to create the composite 3D personal double (PD). For each PD there will be separate user databases where each emotion and each phoneme will be expressed by a unique 3D mesh model.

The visualization application is provided with an avatar database, comprising of 3D mesh models and 2D textures of pre-designed avatars. For each of these avatars there will be separate databases where each emotion and each phoneme will be expressed by a unique 3D mesh model.

During an electronic communication session between the sender's device and the receiving device, the sender is given options for whether his or her digital representation will be presented either solely through his PD, or through the AD that combines different integral parts from the PD and the selected avatar. The sender's PD or AD, 2D texture map and any selected accessories are also transmitted and stored on the receiving device for animation during future communication sessions either from the sender's device or from a server.

The emotion identification module identifies the sender's current emotional state (matched as closely as possible to one of the 50 pre-set emotions from the corpus of emotions database) from three sources: face, voice and/or text. The user also has the option to set a preferred emotion manually through the emotion manual settings. During periodic sampling intervals, the emotions identification module outputs an emotion ID number, e.g., from 0 to 49, corresponding to a certain emotion.

A phonemes (viseme) identification module (180) determines the current phoneme by analyzing either the direct text message or by direct speech recognition through the voice recognition module (190). Simultaneously with the emotion identification, the phoneme identification module outputs a phoneme ID number, e.g., from 0 to 30, corresponding to a particular phoneme. In addition, a speech synthesis module translates written text into an oral message in the absence of voice channel input.

During the communication session, the following signals are output by the visualization application from the sender's device:

Any text

Voice—either live voice or signal from the speech synthesis module (192)

Emotion ID number

Phoneme ID number

The visualization application on the receiver's device receives the output signals from the sender's device. The visualization application on the receiver's device is capable of reproducing full quality PD or AD images in any of the 50 emotional states, pronouncing any of the 30 phonemes, all using two numbers—the emotion ID and the phoneme ID. That is, every sampling interval, in accordance with the emotion ID and phoneme ID, corresponding 3D mesh models and 2D textures are retrieved from the user's emotion and phoneme databases and composed into a final 3D image. A blending module (136, 370) inserts transitional frames between these face images created every sampling. Finally, a synchronization block combines voice, text and the face images to create a fully animated video message displayed on the receiver's device (in place of or along with any text message sent by the sender).

Figure 10:
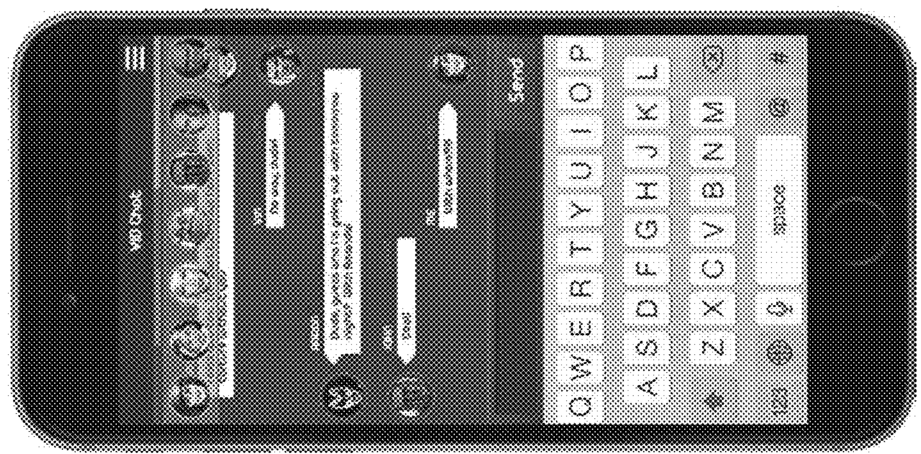
FIG. 10 is a diagram showing one embodiment of a PD (AD) chat user interface.

FIG. 10 is a diagram showing one embodiment of a PD chat user interface. The chat user interface shows an image of the user and a scrollable gallery of avatar templates from which to choose. Once the user selects an avatar template, parts of the user face are composed with the avatar template and displayed as the user's avatar double (AD). Slide bars are also displayed to optionally allow the user to adjust emotion manual settings. During the chat session, the AD is displayed next to the text messages in accordance with the selected emotion manual settings. Note, in this embodiment, the user is not required to make use of the device's camera nor is any video transmitted between the two devices. An existing image of the user will suffice to create the AD.

Figure 11:
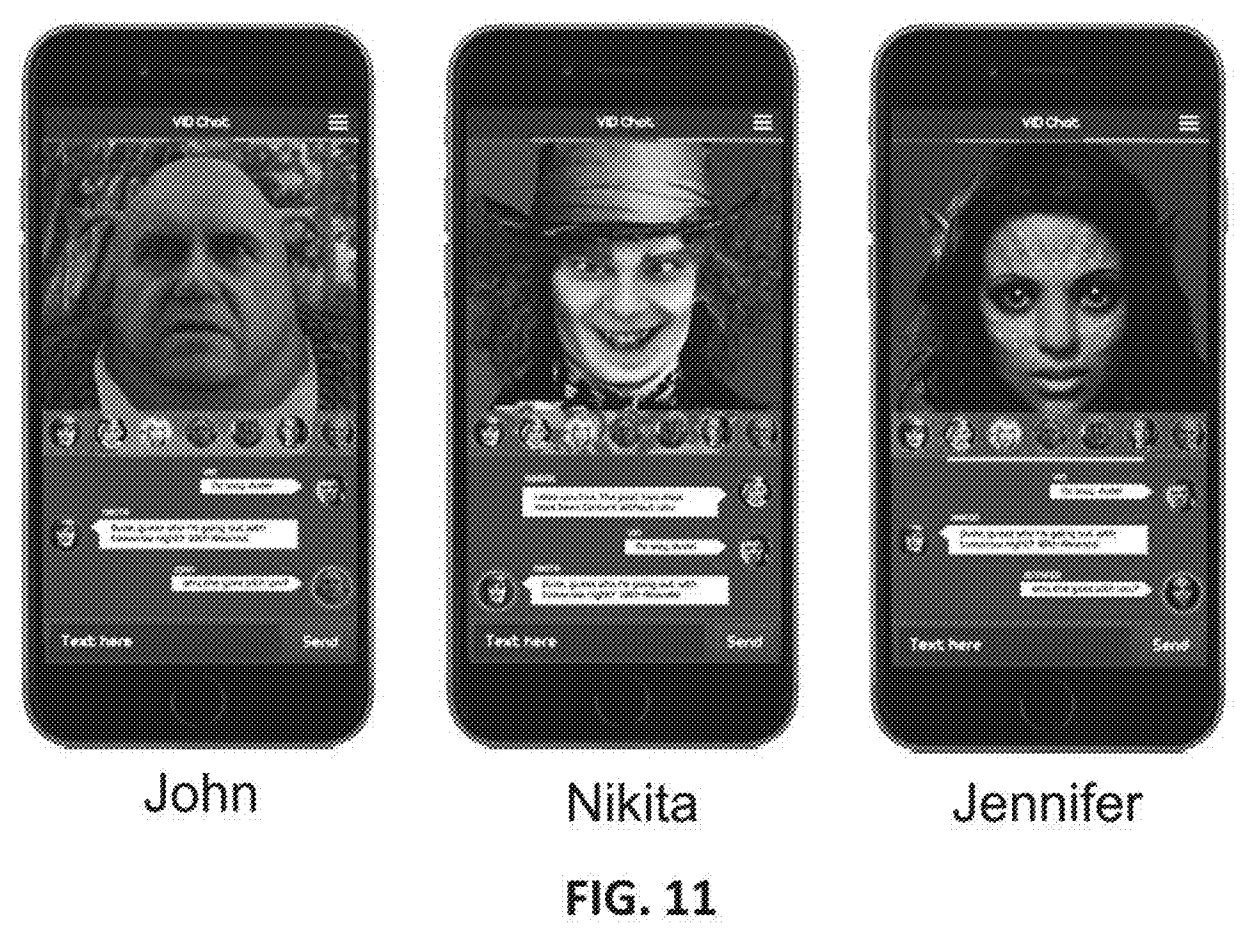

FIG. 11 is a diagram showing examples of how various avatar doubles (ADs) could appear. Since there will be no video data transmission all the visualizations should be smooth and natural, even during a multi-user conference or in other bandwidth constrained environments.

Figure 12:
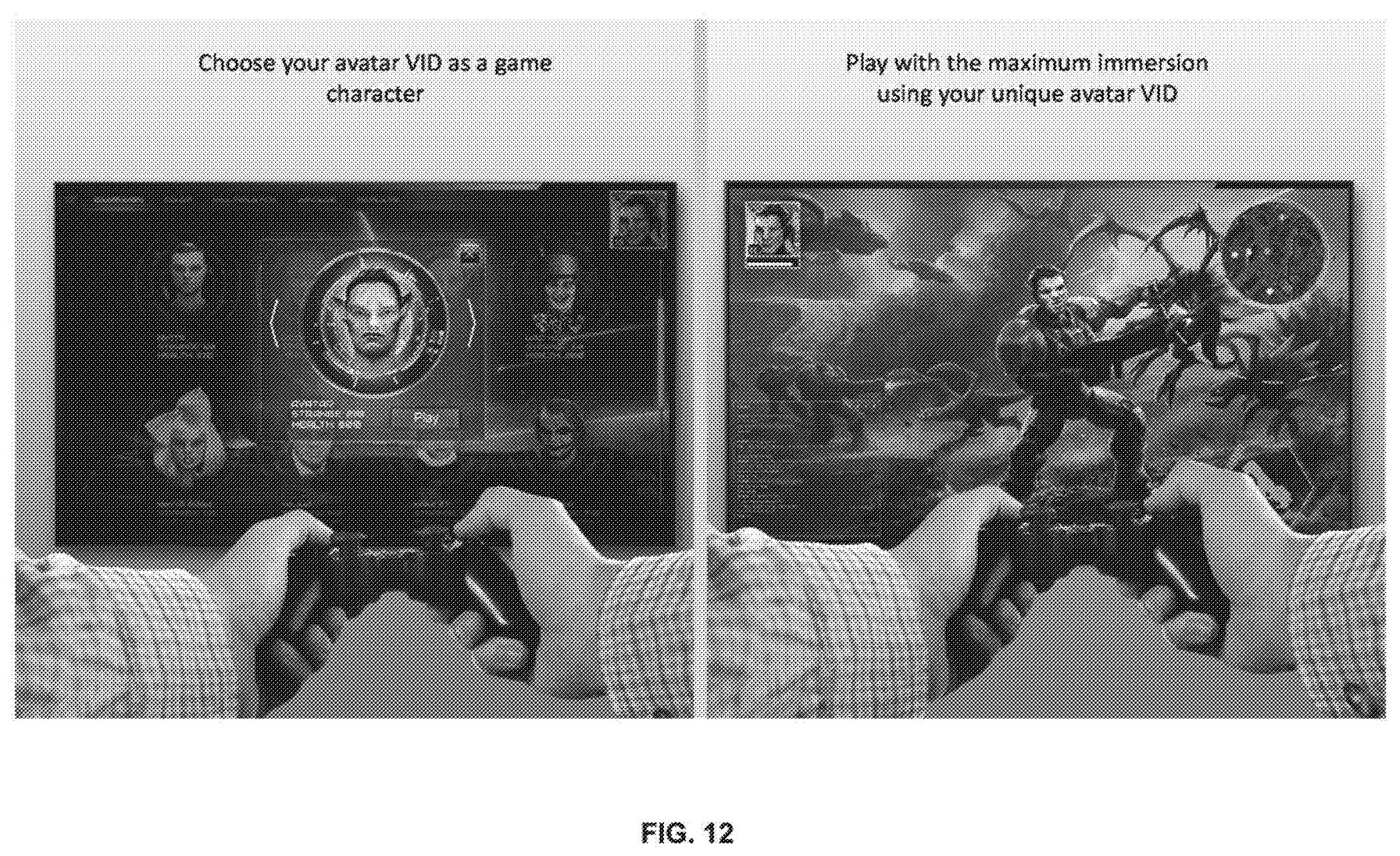

FIG. 12 is a diagram illustrating that the visualization application may be used to create unique AD game characters that are inserted into video games for maximum immersion.

Details regarding a method and system for constructing a visual communication channel between a sender device and a recipient device are described below.

Uniform Model Structure

Figure 13:
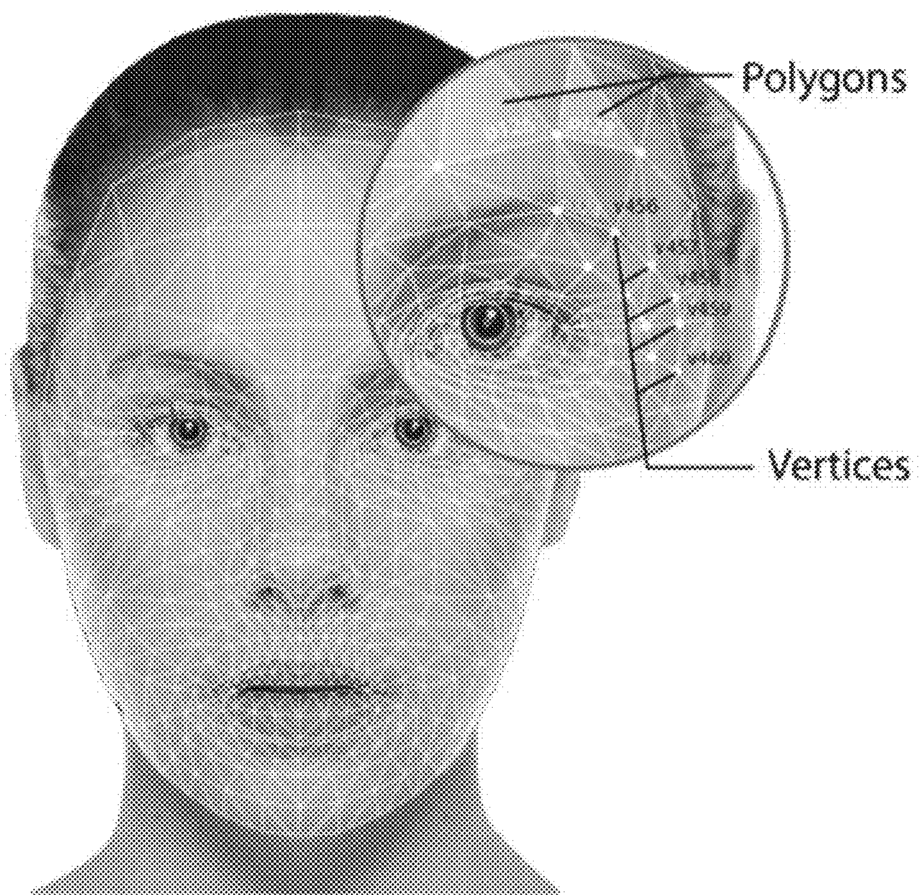
FIG. 13 is a diagram illustrating that each 3D mesh face model comprises a standardized number of similar polygons and corresponding vertices.

The process begins by defining a uniform structure of 3D mesh human model on which all 3D mesh models described herein are based. As shown in FIG. 13, each 3D mesh face model comprises a standardized number of similar polygons (P1, P2, . . . Pm) and corresponding vertices (V1, V2, . . . Vn) with an identical layout.

Figure 14:
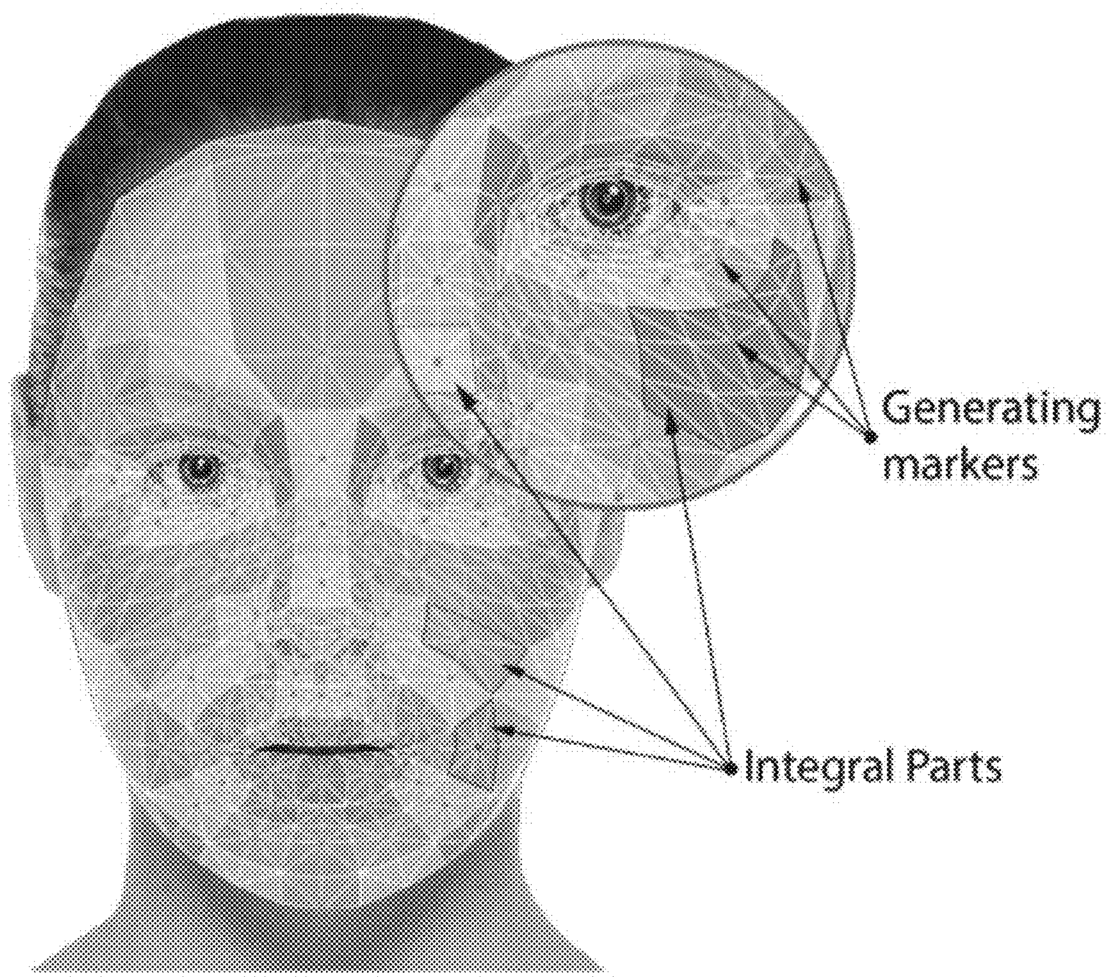
FIG. 14 is a diagram showing example generating markers and integral parts on a 3D mesh model.

FIG. 14 is a diagram showing example generating markers and integral parts on a 3D mesh model. A set of generating markers is also defined within the 3D mesh human face model, and groups of adjacent polygons at different locations in the 3D mesh human model are used to define a set of respective integral parts. Each generating marker has X, Y, Z coordinates on the 3D mesh model. In one embodiment, each of the generating markers may define an integral part at specific coordinates. Module 212 implements the marker generating algorithm.

The exemplary embodiments also define a uniform structure for a 2D texture map of the human face. Each 2D texture map has a standardized resolution, and comprises a set of pixels. In one embodiment, each 3D mesh head model has a uniform set of predefined vertices, and each 2D texture map has a set of predefined pixels aligned with these vertices.

Figure 15:
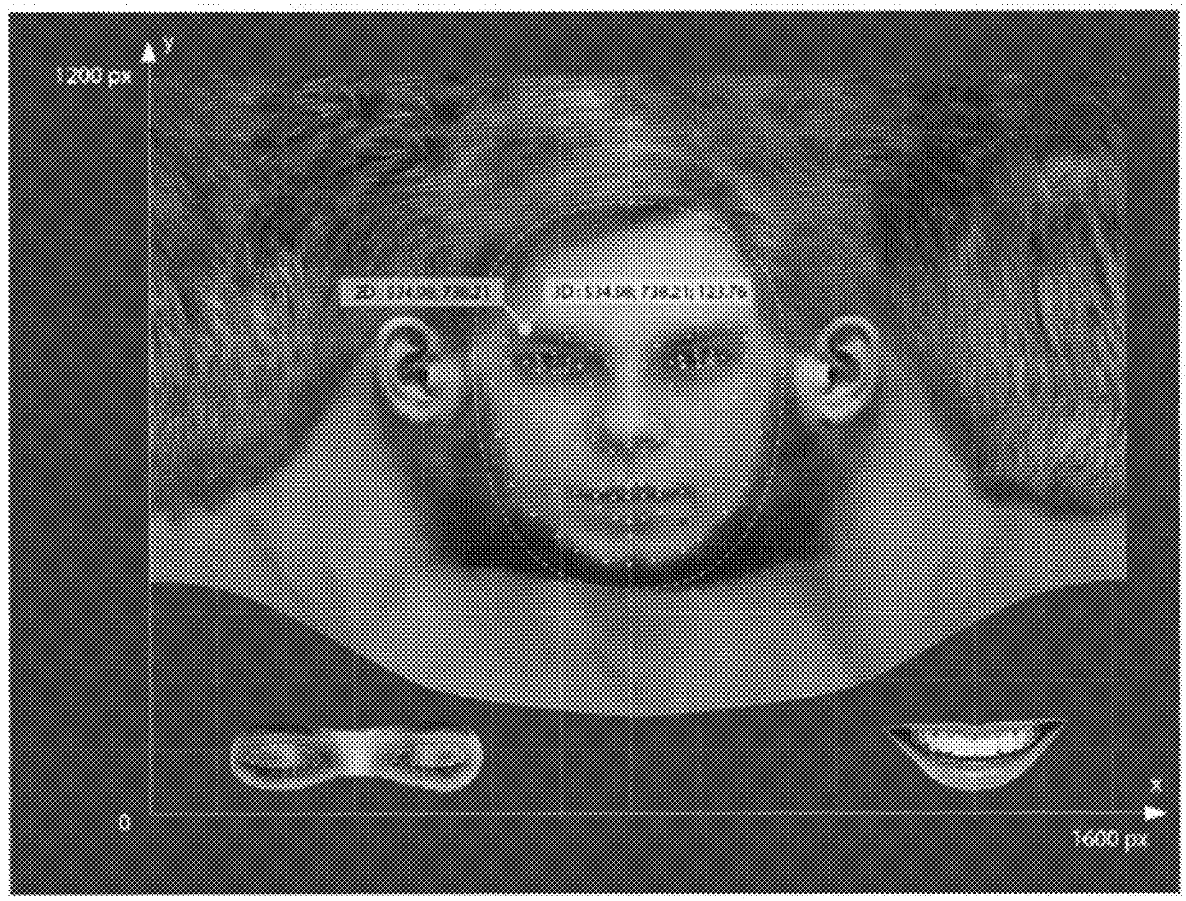
FIG. 15 is a diagram showing that predefined pixels in the 2D texture map at a given U, V coordinate are aligned to corresponding vertices at given X, Y, Z coordinates in the 3D mesh model.

FIG. 15 is a diagram showing that predefined pixels in the 2D texture map at a given U, V coordinate are aligned to corresponding vertices at given X, Y, Z coordinates in the 3D mesh model. The U, V coordinates on the 2D texture map are aligned with the corresponding X, Y coordinates on the 3D mesh model. Such a set of aligned vertices and/or pixels may define a set of generating markers.

In one embodiment, there may be four types of generating markers: a) Mapping Generating Markers (MGM); b) Authentication Generating Markers (AGM); c) Emotion Generating Markers (EGM); and d) Phoneme Generating Markers (PGM), with some of the generating markers belonging simultaneously to more than one type. Module 2122 creates MGM, module 2124 creates AGM, module 2126 creates EGM, module 2128 creates PGM.

Figure 16:
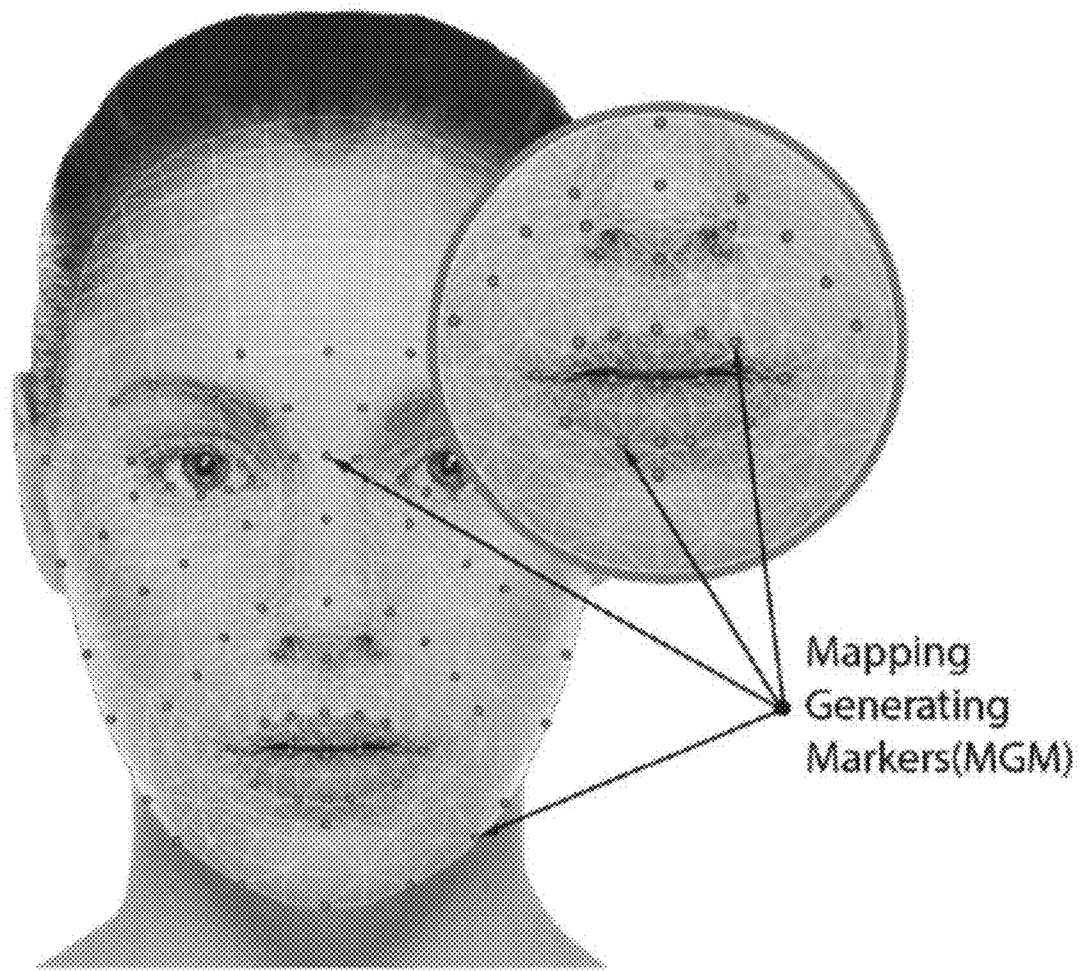
FIG. 16 is a diagram showing the exemplary mapping generating markers.

FIG. 16 is a diagram showing the exemplary mapping generating markers. In one embodiment, the visualization system uses the set of predefined mapping generating markers (MGM) to map the 2D texture onto the corresponding 3D mesh model.

Figure 17:
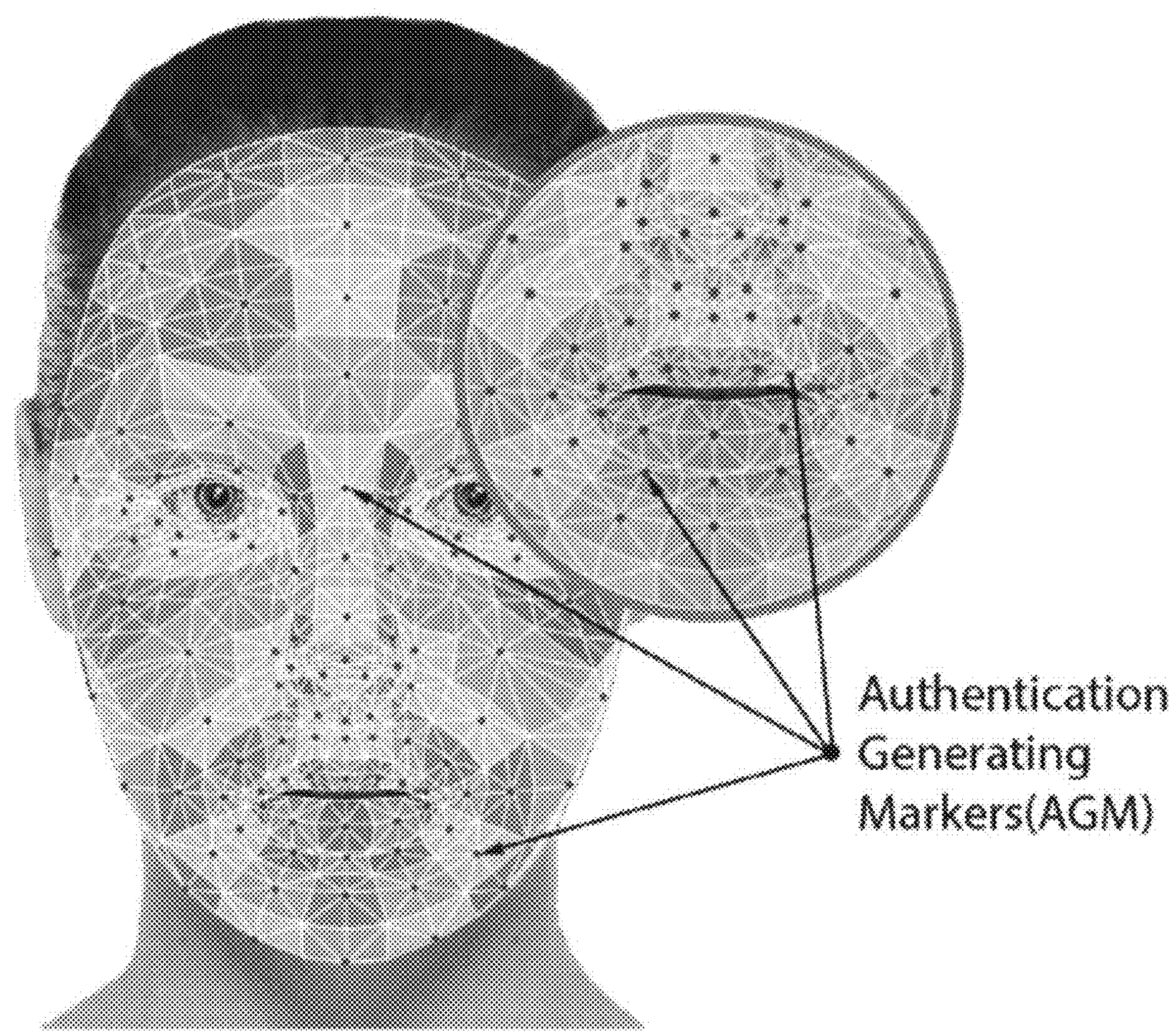
FIG. 17 is a diagram showing the exemplary authentication generating markers.

FIG. 17 is a diagram showing the exemplary authentication generating markers. In one embodiment, the visualization system is capable of dividing any 3D mesh model into a set of uniform authentication integral parts (AIPs), where each of the AIPs is assigned to one of the predefined authentication generating markers (AGMs) while each 2D texture map is conditionally divided into a set of authentication integral parts (AIPs) as well and each AIP is aligned with one of the predefined AGMs on the 3D mesh model.

Figure 18:
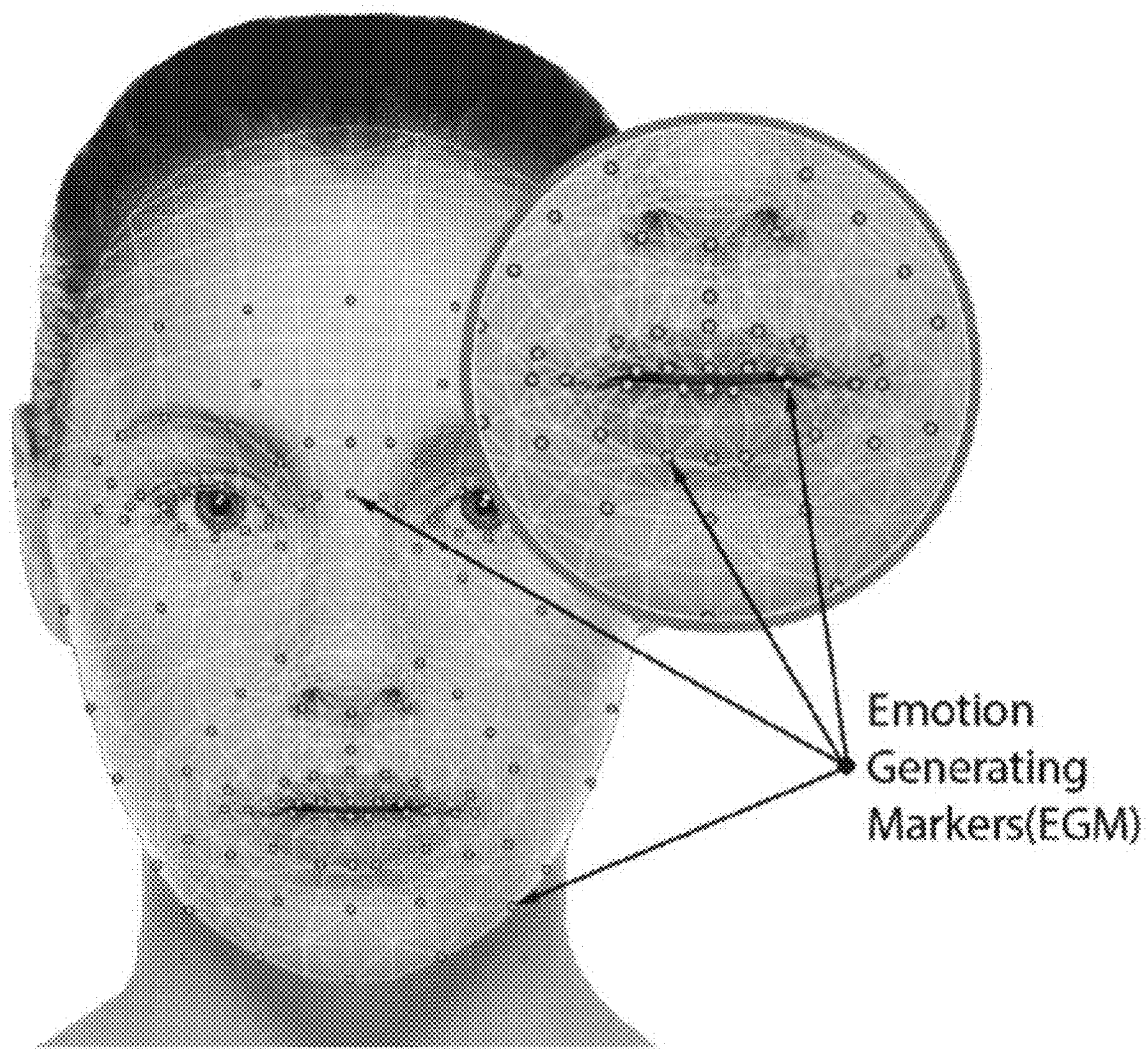
FIG. 18 is a diagram showing the exemplary emotion generating markers.

FIG. 18 is a diagram showing the exemplary emotion generating markers. In one embodiment, the visualization system is capable of dividing any 3D mesh model into a set of uniform emotion integral parts (EIPs), where each is assigned to one of the predefined emotion generating markers (EGMs) while each 2D texture map is conditionally divided into a set of emotion integral parts (EIPs) as well, and each EIP is aligned with one of the predefined EGMs on the 3D mesh model.

Figure 19:
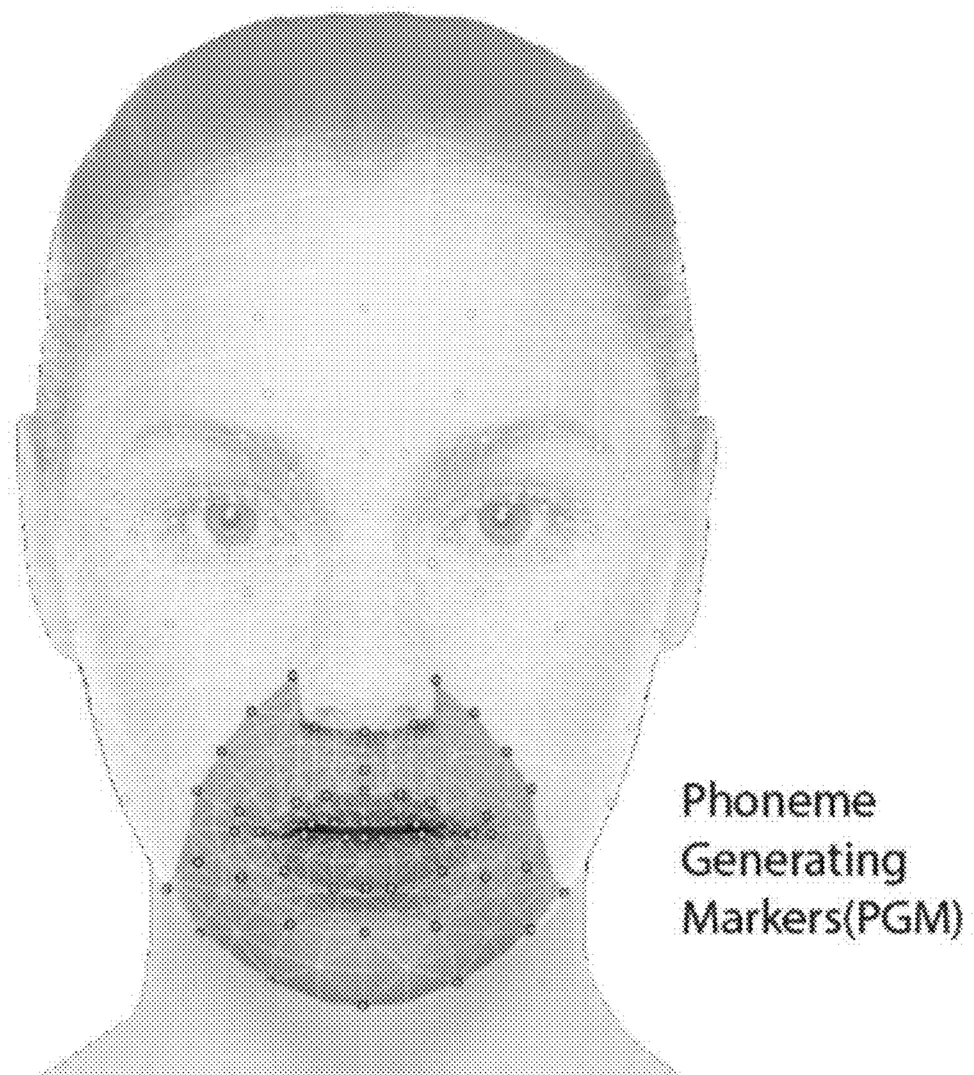
FIG. 19 is diagram showing exemplary phoneme generating markers.

FIG. 19 is diagram showing exemplary phoneme generating markers. In one embodiment, the visualization system is capable of dividing any 3D mesh model into a set of uniform phoneme integral parts (PIPs), where each part is assigned to one of the predefined phoneme generating markers (PGMs) while each 2D texture map is conditionally divided into a set of phoneme integral parts (PIPs) as well, and each PIP is aligned with one of the predefined EGMs on the 3D mesh model.

Corpus of Faces Databases

According to one aspect of exemplary embodiments, the visualization system makes use of three primary databases; the corpus of faces database (neutral faces), the corpus of emotions database, and the corpus of phonemes database.

Figure 20:
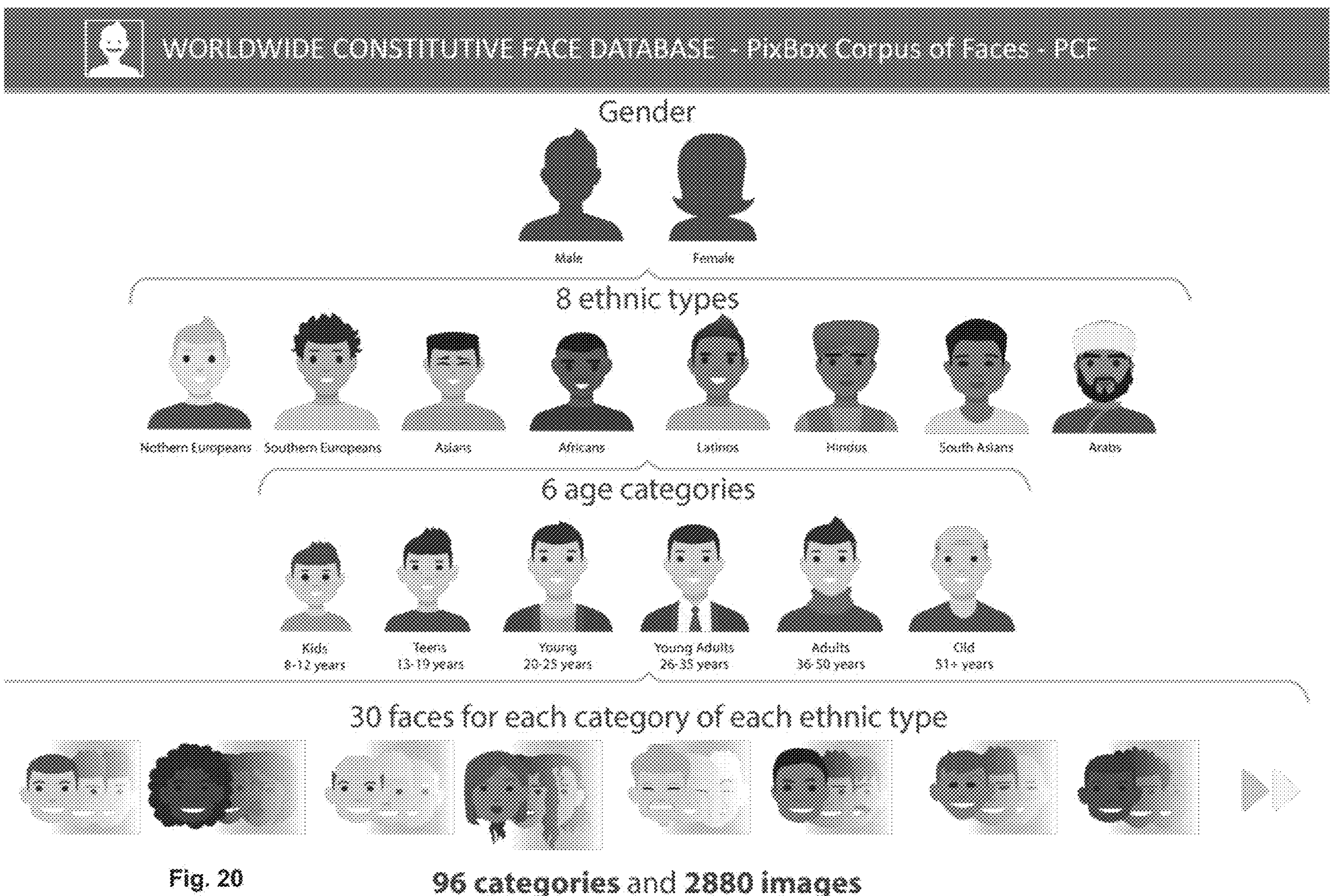
FIG. 20 is a diagram showing how the reference database of human neutral faces is set up.

In one embodiment, the corpus of faces is a reference database comprising uniform 3D mesh models and uniform 2D textures, each representing human neutral faces. FIG. 20 is diagram graphically showing how the reference database of human neutral faces is set up. In one embodiment, the corpus of faces database includes a 3D mesh model and corresponding 2D texture map for each gender, 8 ethnic types for each gender, 6 age categories for each ethnic type, and 30 faces for each age category of each ethnic type, equaling 2880 images.

Figure 21:
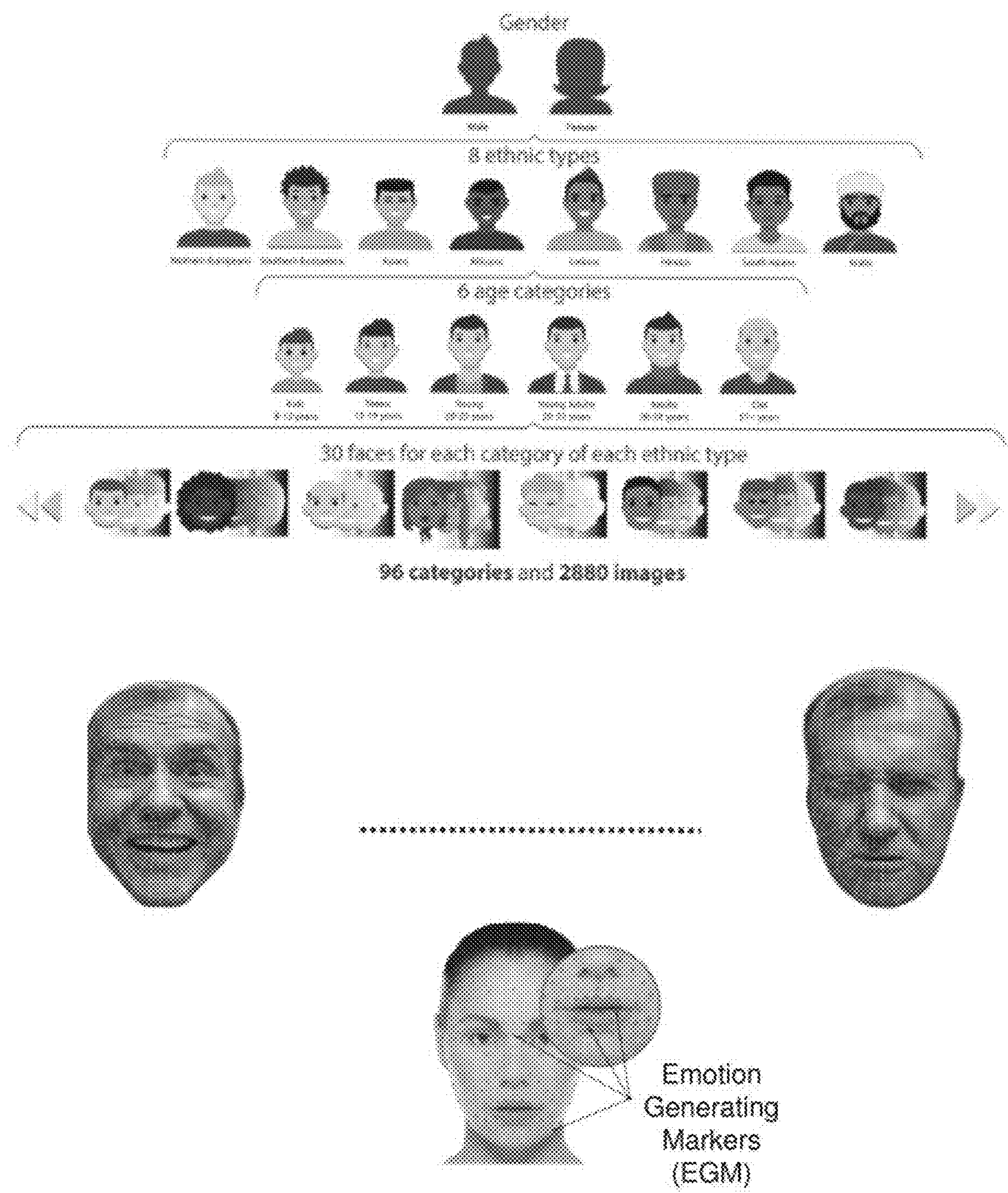
FIG. 21 is diagram showing the reference database of human faces where each unit presents a certain emotion defined by the coordinates of emotion generating markers.

In one embodiment, the corpus of emotion database is a reference database comprising a core set of uniform 3D mesh model of faces, each representing a single emotion from a set of predefined emotions (see FIG. 6), for each of the neutral faces in the corpus of faces database. FIG. 21 is a diagram illustrating that each 3D mesh model face emotion has a set of EGM coordinates determined for each EIP of each emotion.

Figure 22:
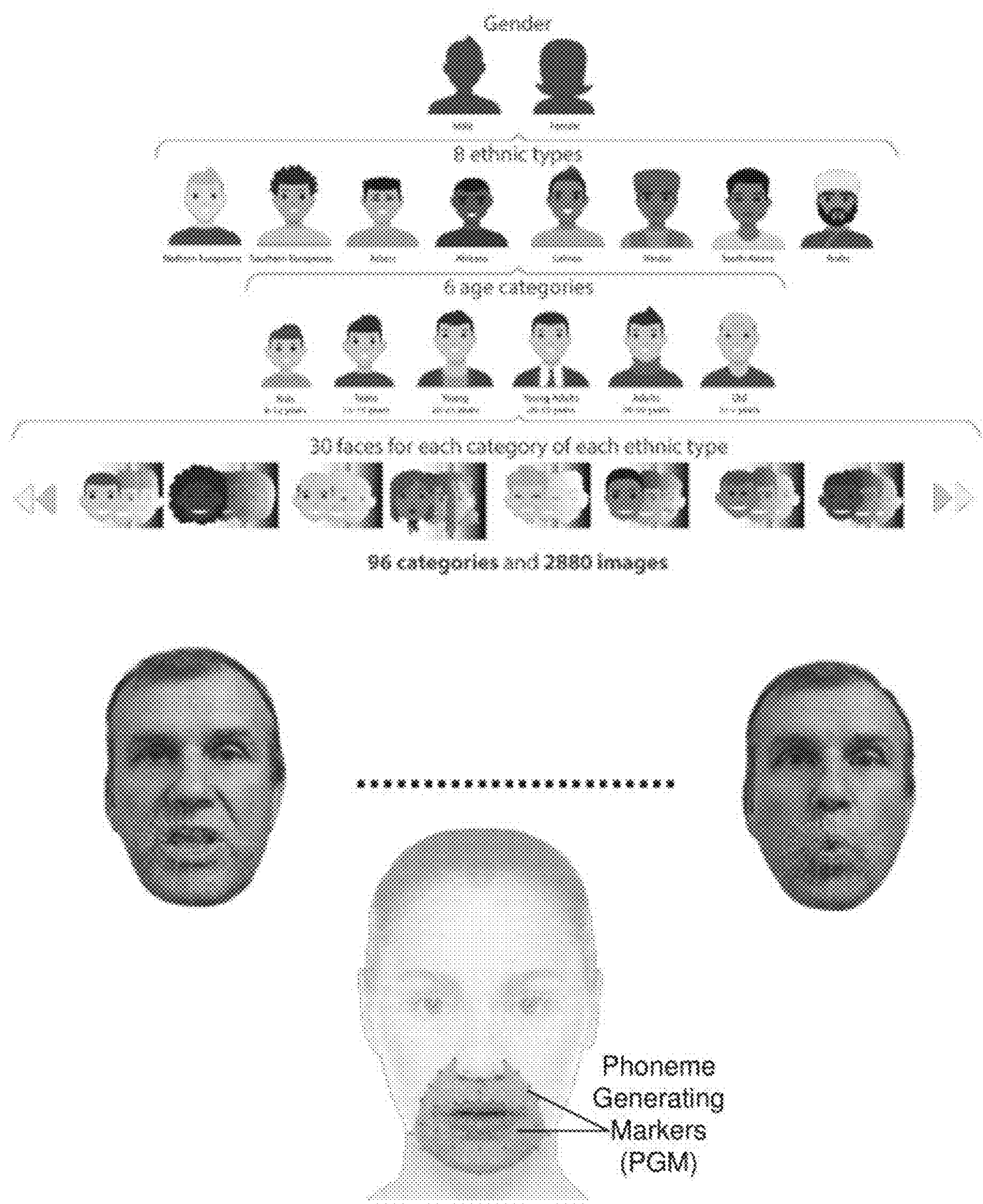
FIG. 22 is a diagram showing the reference database of human faces where each unit presents a certain phoneme defined by the coordinates of phoneme generating markers.

In one embodiment, the corpus of phoneme database is a reference database comprising a core set of uniform 3D mesh models, each representing a human face phoneme/viseme from a set of predefined linguistic phonemes for each of the neutral faces in the corpus of faces database. FIG. 22 is a diagram illustrating that each 3D mesh model face emotion has a set of PGM coordinates determined for each PIP of each linguistic phoneme.

Operational Processes

After the visualization application is loaded on the user's device (or the user accesses a hosted version of the application via a web browser), the first step is for the user to create his/her personal double (PD).

Figure 23A:
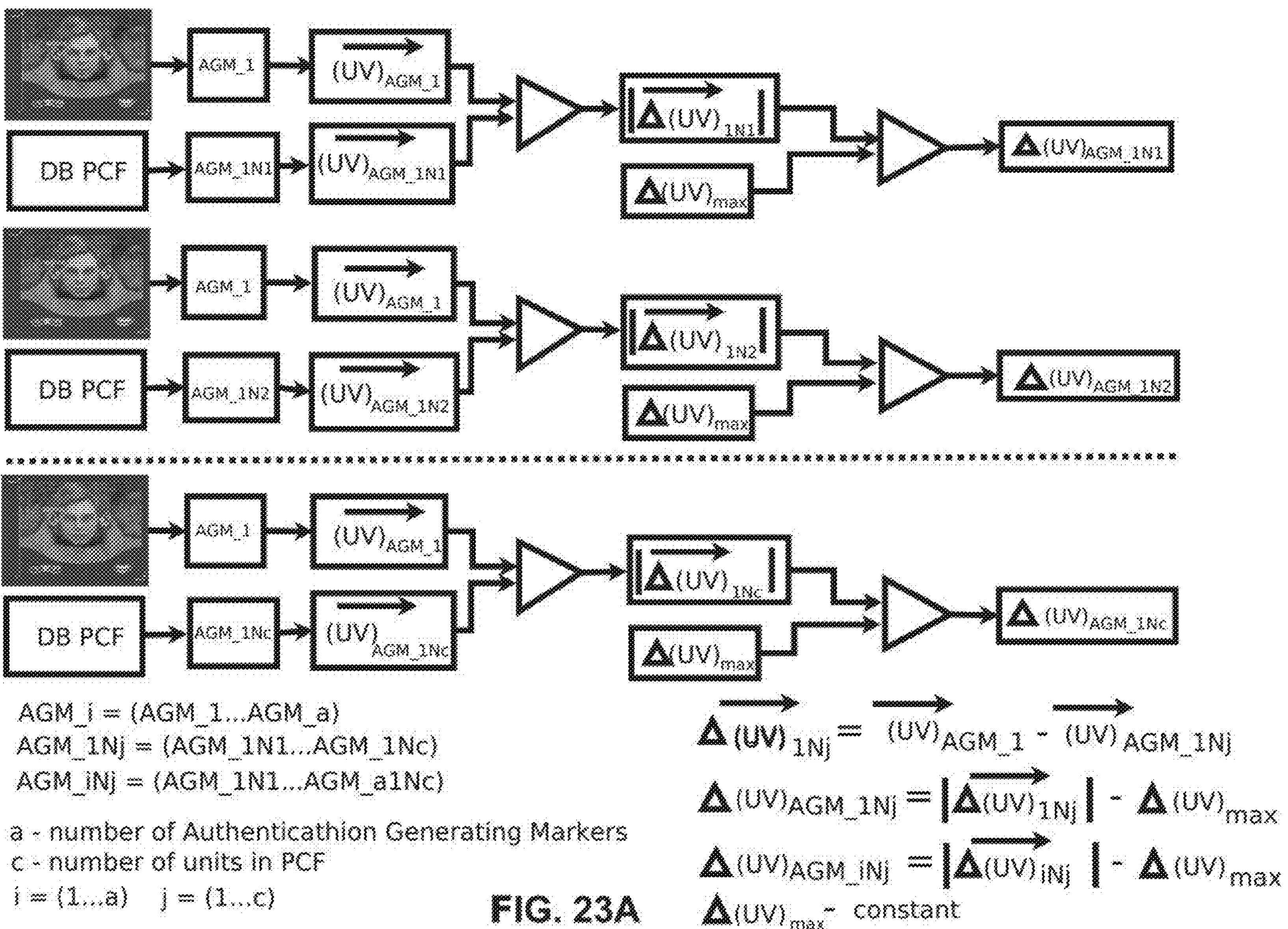
FIGS. 23A and 23B are diagrams showing the process of searching the corpus of faces database to find the closest match between the sender's face 2D texture map and 2D texture maps of the templates from the corpus of neutral faces database using AGMs.

FIG. 23A is a diagram showing the process that begins by creating a 2D texture map of the user. Data may be obtained from the sender's device camera (see FIG. 1) for creating the uniform 2D texture map of his/her neutral face. Thereafter, a set of predefined AGMs (see FIG. 17) is determined for the sender's 2D texture map, for the neutral face, and the U, V and Z coordinates (see FIG. 15) are calculated for each AGM. The AGMs are each aligned with the corresponding AGMs from the uniform 2D texture maps of the samples from the corpus of faces database.

Figure 23B:
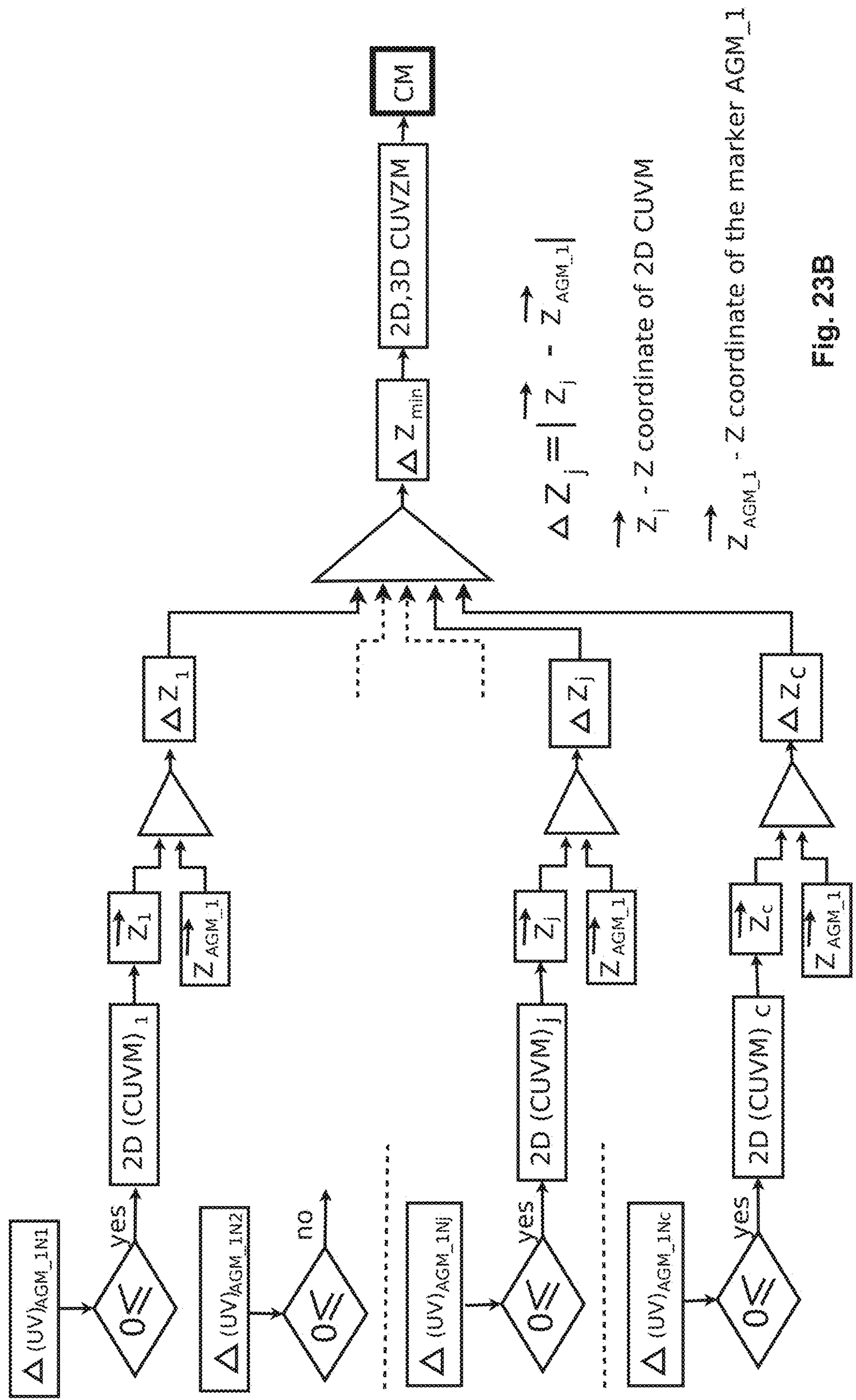

FIGS. 23A and 23B are diagrams that further shows the process of searching the corpus of faces database to find the closest match between the sender's neutral face 2D texture map and 2D texture maps of the templates from the corpus of neutral faces database using AGMs. As shown, each AGM of the sender's uniform 2D texture map, for the neutral face, is compared with the corresponding AGM of the 2D texture maps of neutral face samples from the corpus of faces database, and the closest UV coordinate matches detected. In one embodiment, the closest UV match (2D CUVM) means that the distance in UV coordinates, Δ(UV), between two corresponding AGMs is within a predetermined range; UV texture coordinates may be generated using mapping in Eye Coordinates. Thereafter, the distances, ΔZ, between Z coordinates of all 2D CUVMs and the Z coordinate of the corresponding AGM of sender's 2D texture are calculated to determine which 2D CUVM has the minimal ΔZ, and this 2D CUVM is determined to be the 2D closest UVZ match (2D CUVZM). Each 2D CUVZM is aligned with the corresponding integral part of the detected 3D mesh model from the corpus of faces database, which is respectively the 3D closest UVZ match (3D CUVZM), or in short CM. Determining CM is provided in the AGM Comparison Module (214—see FIG. 33).

Figure 24:
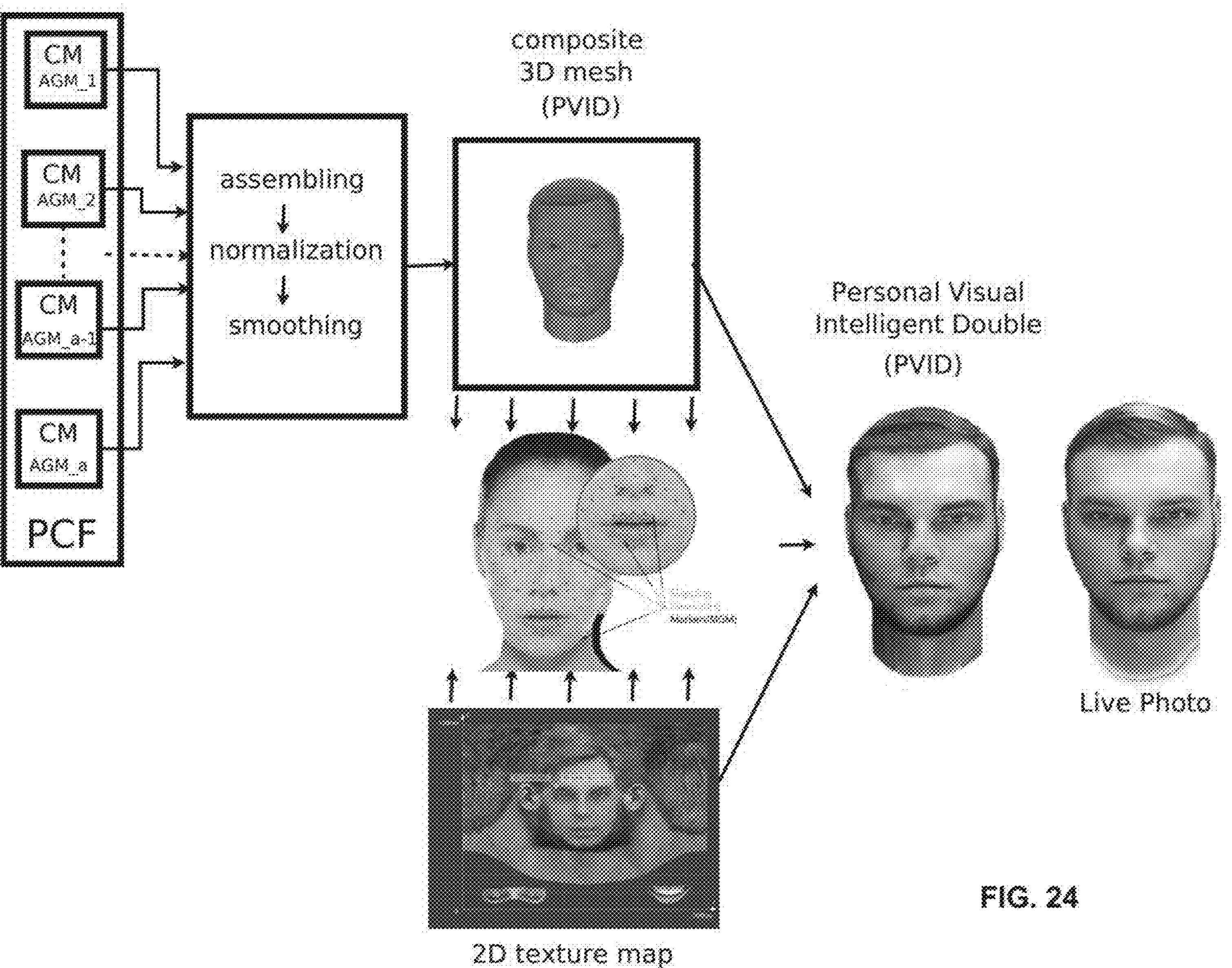
FIG. 24 is a diagram illustrating the process for assembling the sender's personal double.

FIG. 24 is a diagram illustrating the process for assembling the sender's personal double. Integral parts from the neutral 3D mesh models from the corpus of faces database having the closest UVZ matches (CMs) are used to assemble a composite 3D mesh model. A normalization (smoothing) procedure may be performed during assembly of the integral parts into a single 3D mesh model. The sender's 2D texture map is mapped onto the composite 3D mesh model to create the sender's personal visual intelligent double (PVID), or in short PD.

Figure 25:
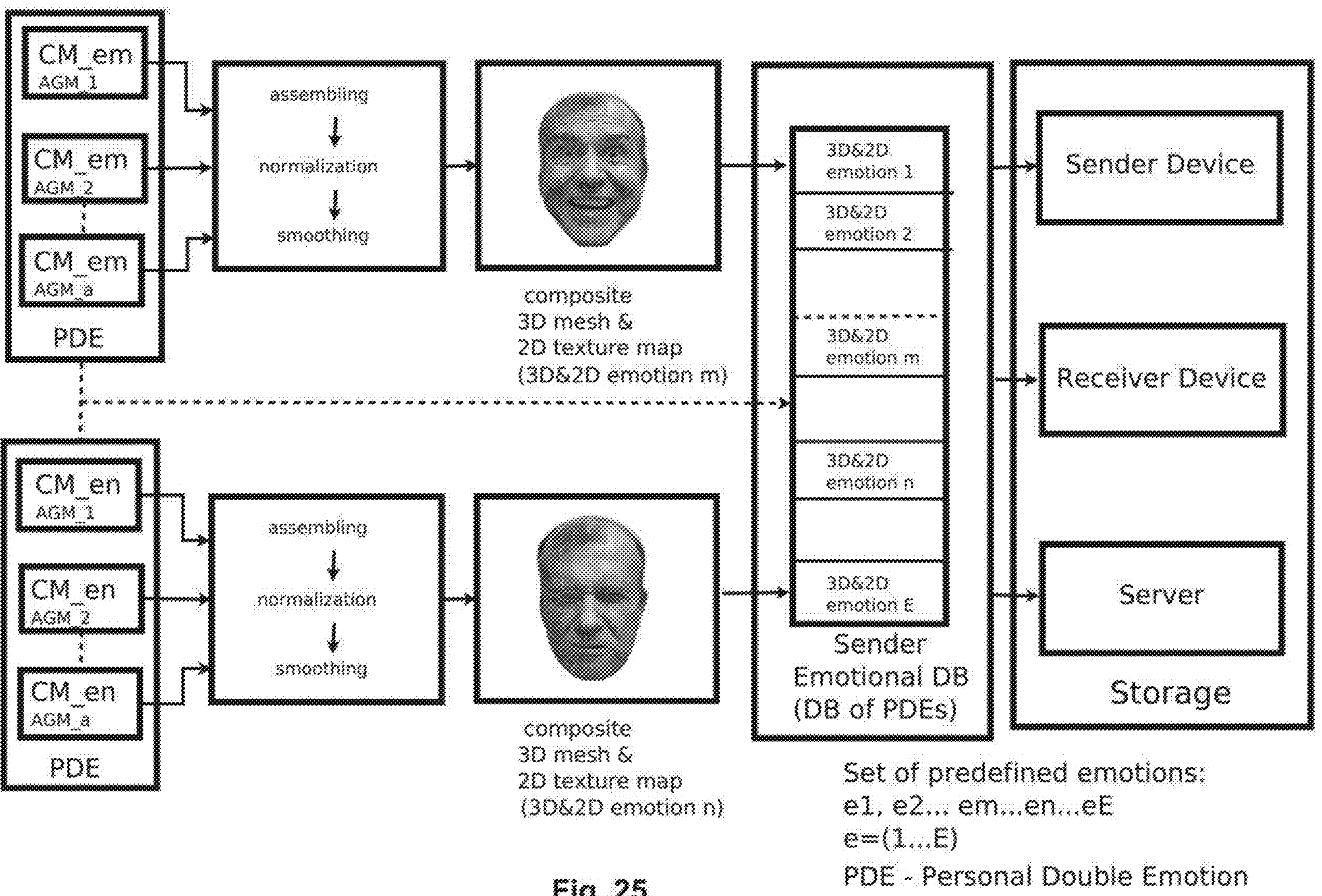
FIG. 25 is a diagram illustrating the process of creating the database of emotions for each personal double.

FIG. 25 is a diagram illustrating the process of creating the corpus of emotions database for the PDs—225. In one embodiment, a PD of a particular emotion from the predefined set of emotions is assembled by composing corresponding CMs of the 3D mesh models for the given emotion from the corpus of emotions database. A personal double emotions (PDE) database (226 DB) comprises PDs for all the emotions from the predefined set, and the PDE database is stored on a server, on sender device and on a receiver device.

Figure 26:
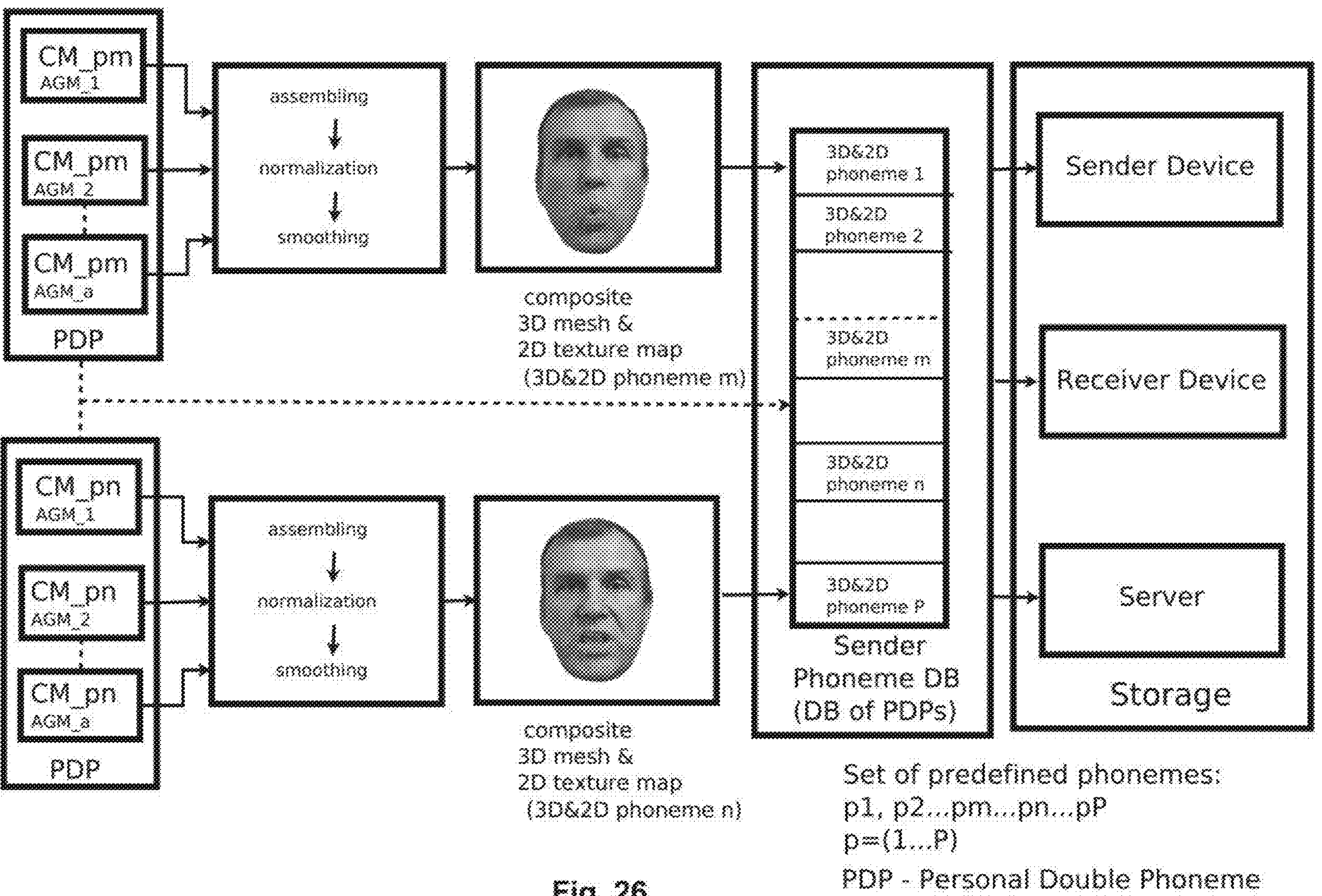
FIG. 26 is a diagram illustrating the process of creating the database of phonemes for each personal double.

FIG. 26 is a diagram illustrating the process of creating the corpus of phonemes database for the PDs. In one embodiment, a PD of a particular phoneme from the predefined set of phonemes is assembled by composing corresponding CMs of the 3D mesh models for the given phoneme from the corpus of phonemes database —227. A personal double phonemes (PDP) database (228 DB) comprises PDs for all the phonemes from the predefined set, and the PDP database is stored on a server, on sender device and on a receiver device.

The user's personal 2D texture map (2DU) is used for further mapping on any integral part from PDE or PDP or any combinations of those parts.

A reference database of avatars or Corpus of Avatars (232 DB) comprising uniform 3D mesh models and uniform 2D textures is also developed and stored on the server.

FIG. 3 is a diagram illustrating the process of creating the avatar double (AD). A hybrid 3D mesh model (3DH) is assembled comprising respective parts the user's personal 3D mesh model (3DP), for the neutral face, and an avatar 3D mesh model (3DA), for the neutral face, by replacing with the sender PD integral parts the corresponding parts from the avatar 3D mesh model. The composite object is referred to as the avatar visual intelligent double (AVID), or in short AD.

Figure 27:
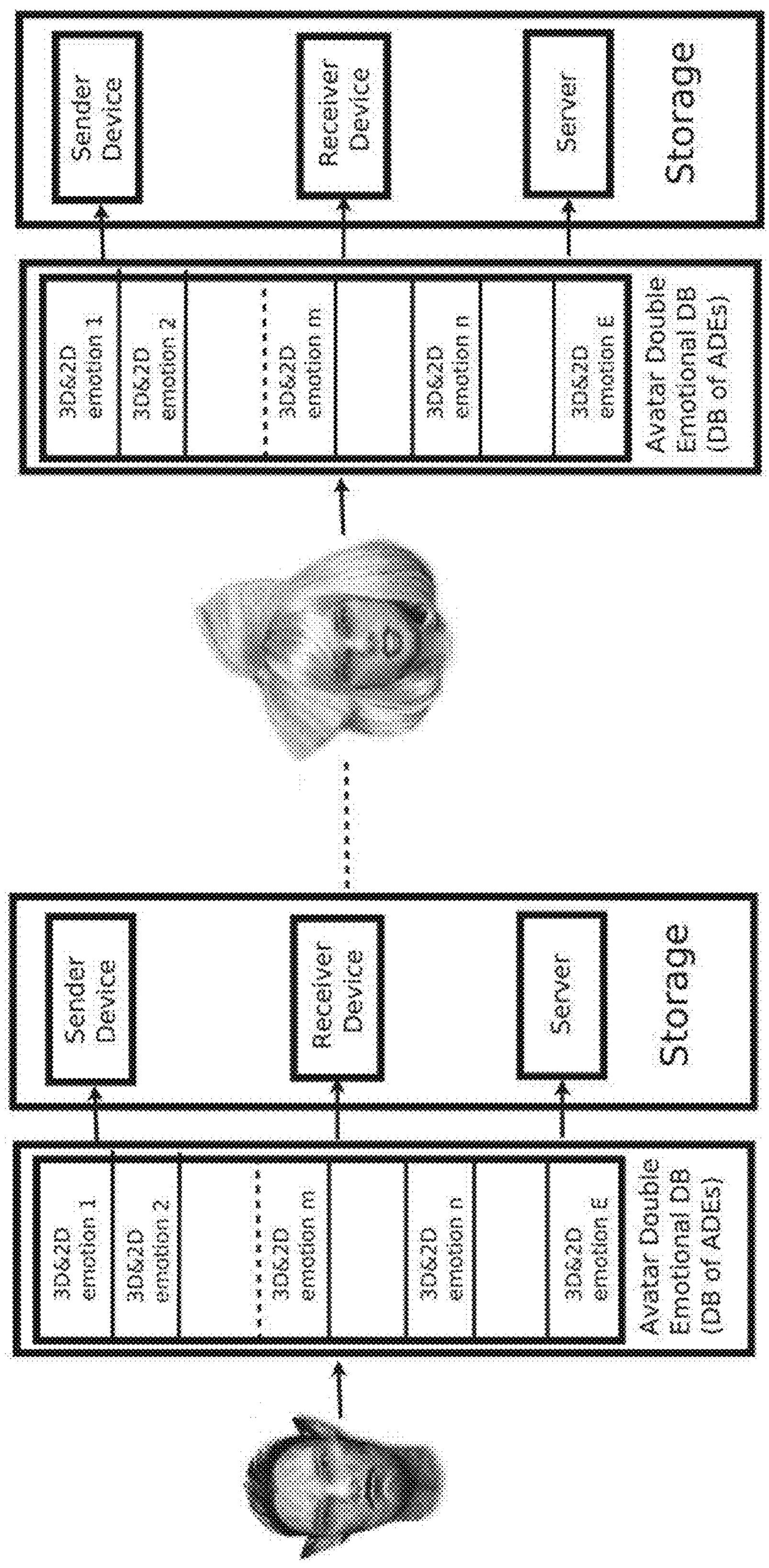
FIG. 27 is a diagram illustrating the process of creating the databases of emotions for different avatar doubles.

FIG. 27 is a diagram illustrating the process of creating the databases of emotions for different avatar doubles (ADs)—235. In one embodiment the AD for a particular emotion from the predefined set of emotions is assembled by composing the corresponding parts from the PD and from avatar 3D mesh model for the given emotion from the corpuses of emotions database. An avatar double emotions (ADE) database comprises ADs for all the emotions from the predefined set, and the ADE database (236 DB) is stored on a server, on ender device and on receiver device.

Figure 28:
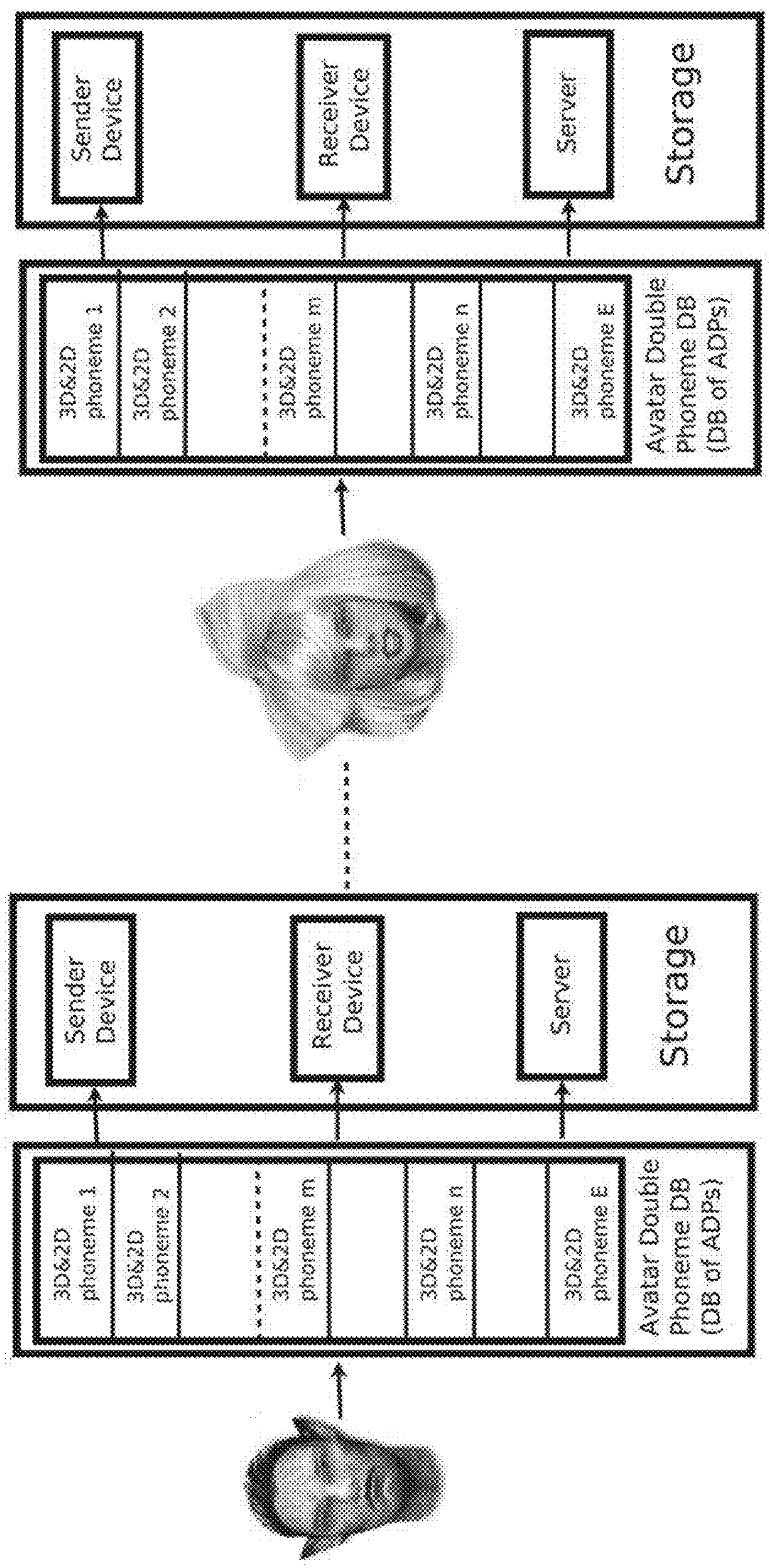
FIG. 28 is a diagram illustrating the process of creating the databases of phonemes for different avatar doubles.

FIG. 28 is a diagram illustrating the process of creating the databases of phonemes for different avatar doubles (ADs)—237. In one embodiment the AD for a particular phoneme from the predefined set of phonemes is assembled by composing the corresponding parts from the PD and from Avatar 3D mesh model for the given phoneme from the corpuses of phonemes database. An avatar double phonemes (ADP) comprises ADs for all the phonemes from the predefined set, and the ADP database (238 DB) is stored on a server, on sender device and on receiver device.

A hybrid 2D texture (2DH) comprising respective parts of the sender's personal 2D texture (2DP) and Avatar 2D texture (2DA) are used for further mapping on any part from the ADE or ADP or any combinations of those parts. A particular 2DH may be assembled when the sender chooses which parts of his PD to use in his AD.

The sender device recognizes an emotion from any or all of the three sources, face, voice, and text, or receives a manual selection of a certain emotion from the sender. The emotion identification module uses the recognized emotion (e.g., by name) as an index to retrieve the emotion ID of the corresponding 3D mesh model from personal double emotions (PDE) or avatar double emotions (ADE) databases. The retrieved emotion ID is then sent over the communication channel to the receiver device.

The sender device recognizes the phoneme from any or all of the three sources, face, voice, and text, and the phoneme (viseme) identification module uses the recognized phoneme (e.g., by name) as an index to retrieve the phoneme ID of the corresponding 3D mesh model from the personal double phonemes (PDP) or avatar double phonemes (ADP) databases. The retrieved phoneme ID is then sent over the communication channel to the receiver device On the receiver device, once the communication channel has been opened with the sender, the ID of the sender is perceived and used to access the sender's PD emotion database and PD phoneme database and the sender's 2D texture map. The receiver device is also made aware of any avatar selected by the sender and is used to retrieve the avatar emotion database and avatar phoneme database and avatar 2D texture map.

Based on the emotion ID and phoneme ID received from the sender device, the phoneme identification model retrieves the 3D mesh model of the identified emotion from the personal double emotion (PDE) database, and the 3D mesh model of the identified phoneme from the personal double phoneme (PDP) database. The emotions and phonemes synthesis module then combines the 3D mesh model of the identified emotion and the 3D mesh model of the identified phoneme. The resultant sender 3D image represents the user's face, the avatar face, or a hybrid sender/avatar face pronouncing the identified phoneme in the identified emotional state at every sampling instant.

Figure 29:
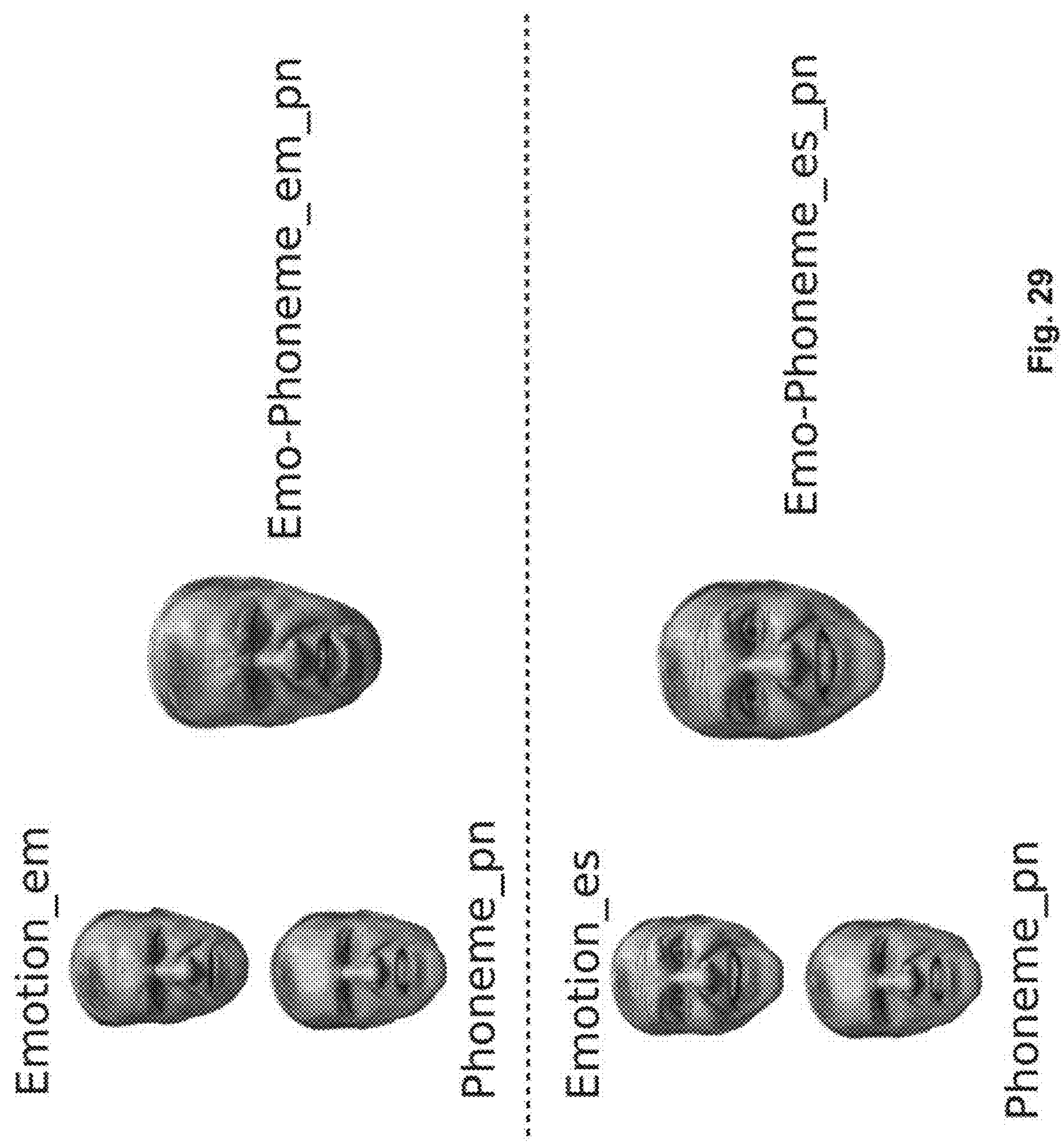
FIG. 29 is a diagram illustrating the process of combining two 3D mesh models: one representing a particular emotion and another one representing a particular phoneme; the resultant 3D mesh model represents a phoneme that has been pronounced in a particular emotional state.
Figure 30:
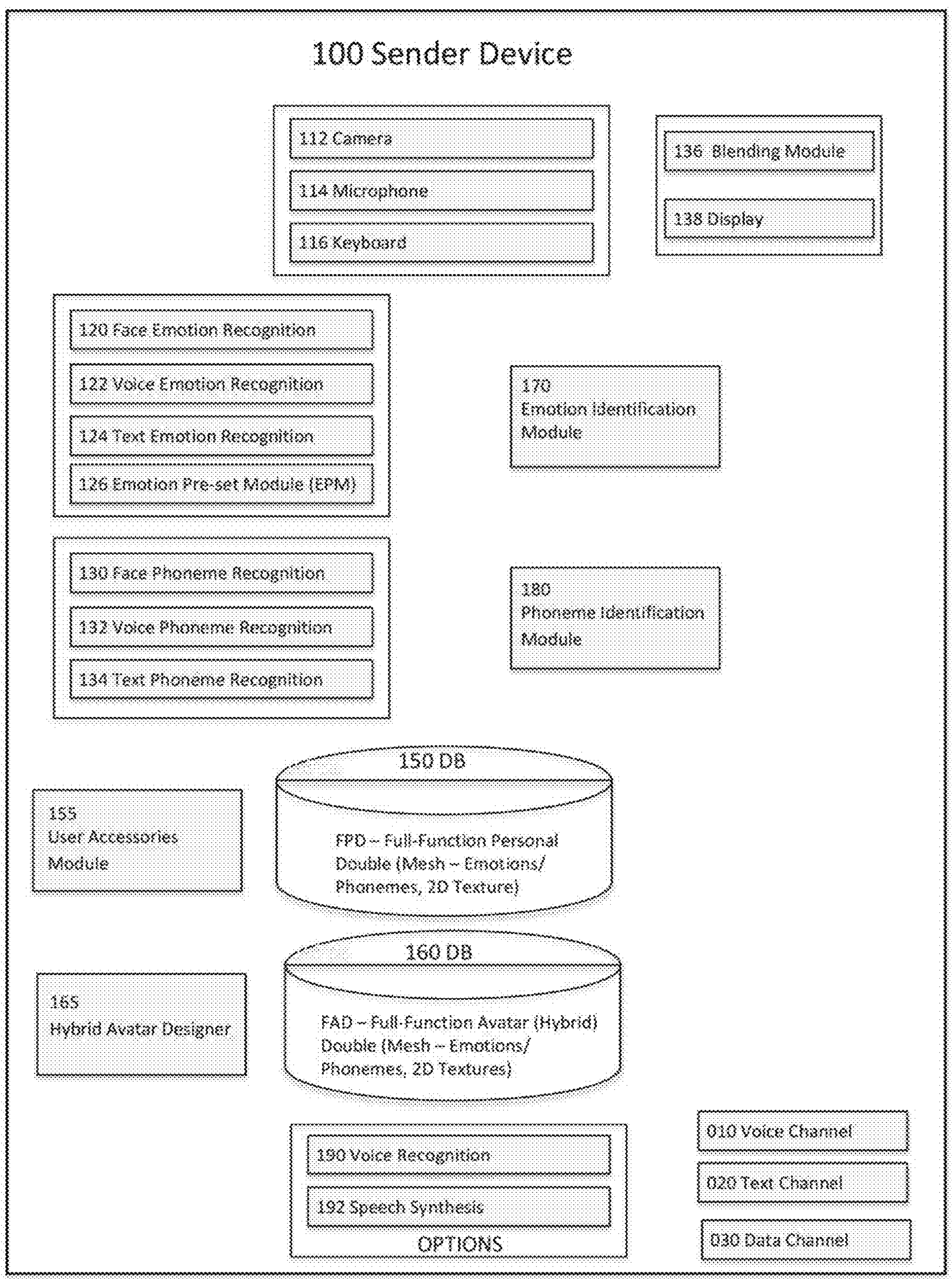
FIG. 30 is a block diagram illustrating base modules on the sender device for implementing full-function doubles, according to an embodiment.
Figure 31:
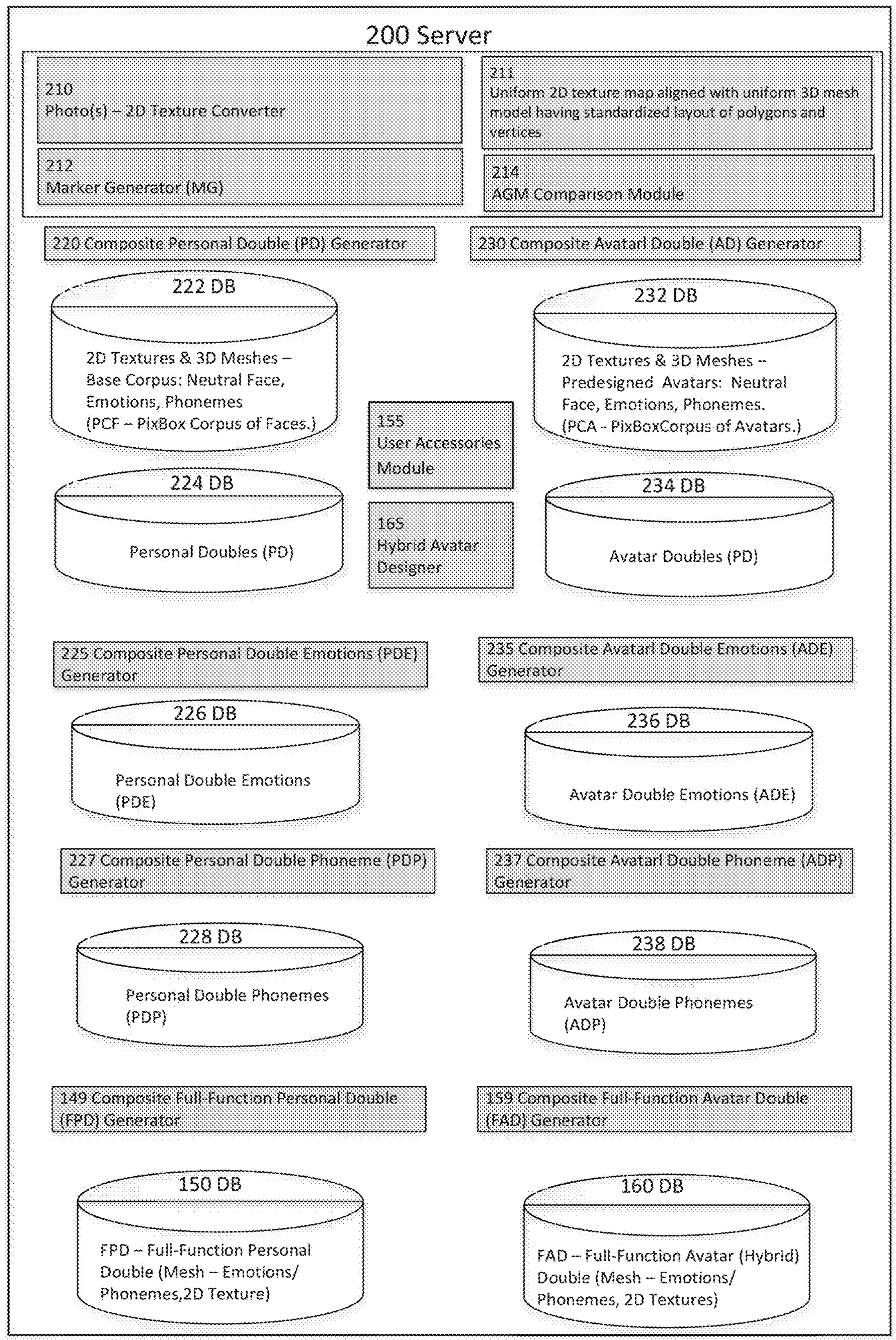
FIG. 31 is a block diagram illustrating base modules on the server for implementing full-function doubles, according to an embodiment.
Figure 32:
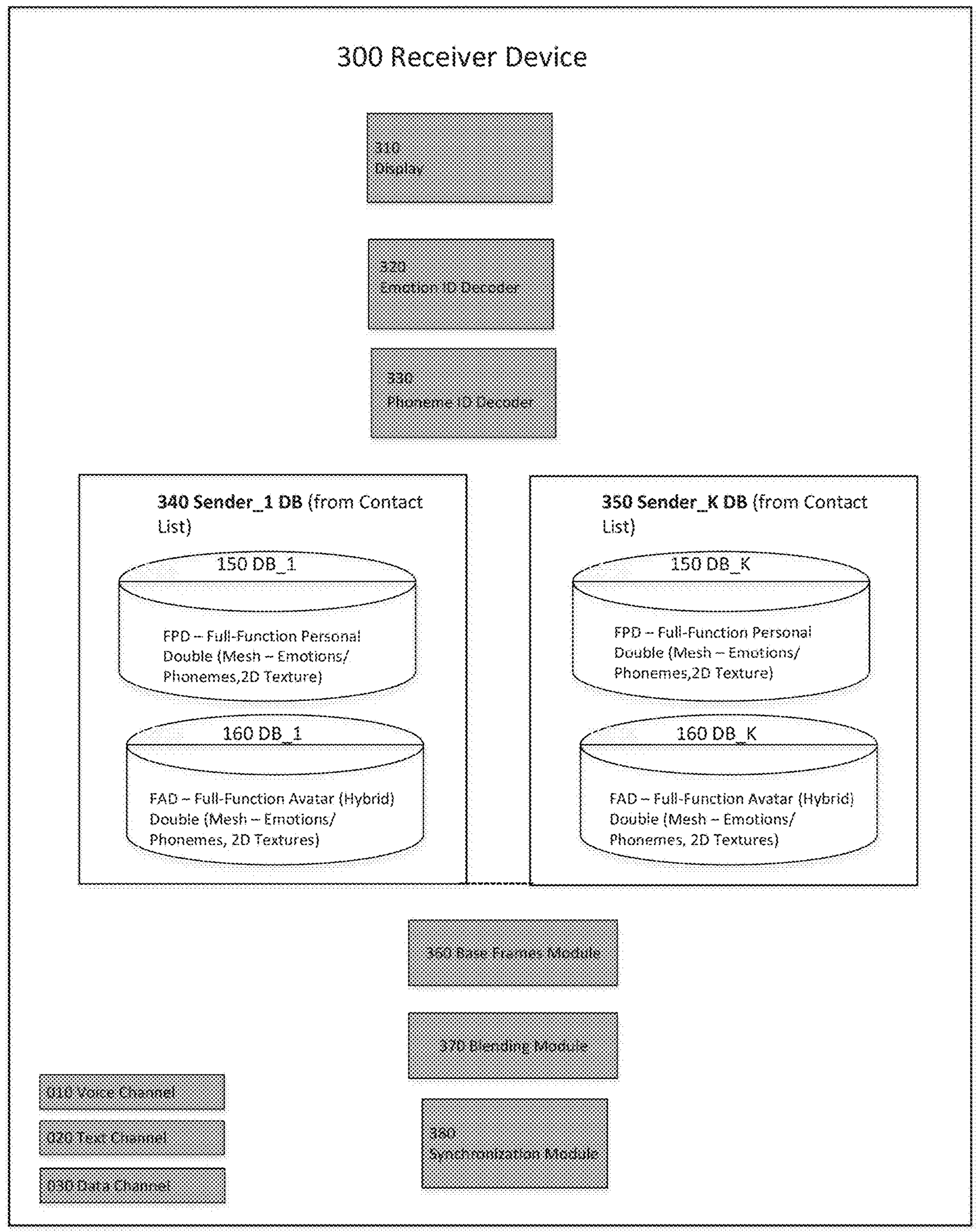
FIG. 32 is a block diagram illustrating base modules on the receiver device for implementing full-function doubles, according to an embodiment.

FIG. 29 is a diagram illustrating the process of combining two 3D mesh models: one representing a particular emotion and another one representing a particular phoneme; the resultant 3D mesh model represents a phoneme that has been pronounced in a particular emotional state. Mathematically, the emotions and phonemes synthesis module recalculates the X, Y, Z coordinates of the given generating markers for the given integral parts of the 3D mesh model from the PDE database based on which 3D mesh model from PDP it has to be combined with, or for the given integral parts of the 3D mesh model from ADE database based on which 3D mesh model from ADP database it has to be combined with.

All the transitional frames between the 3D images are created by the blending block (136, 370) through a blending operation, such that the receiver sees a fully functional video when displayed (See FIG. 9). Since there is no video data transmission during the communication session, and the user sees smooth and uninterrupted visual moving patterns even in the mode of multi-user conference or in other bandwidth constrained environments.

Figure 33:
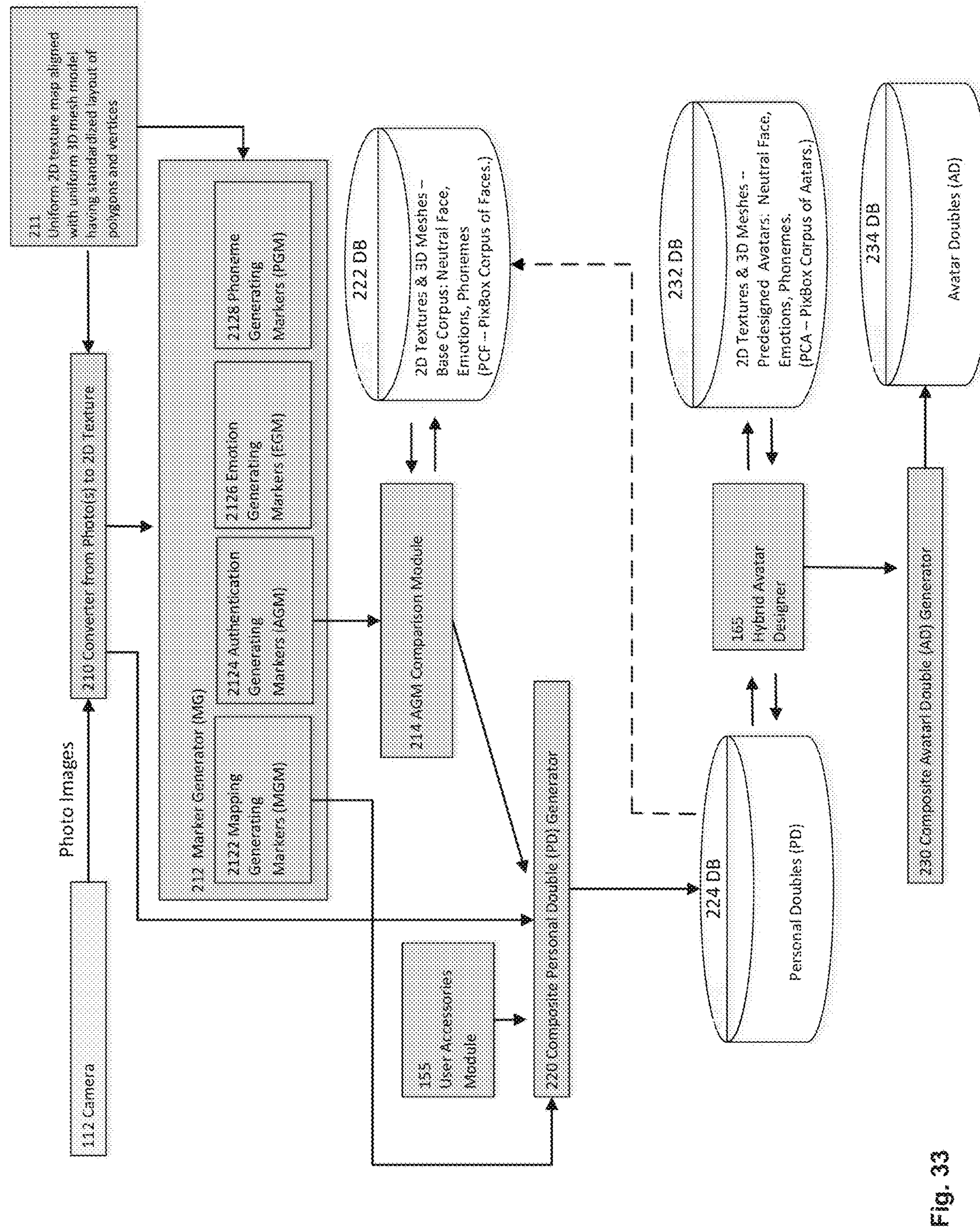
FIG. 33 is a system diagram illustrating a process of creating personal doubles and avatar doubles on the server, according to an embodiment.
Figure 37:
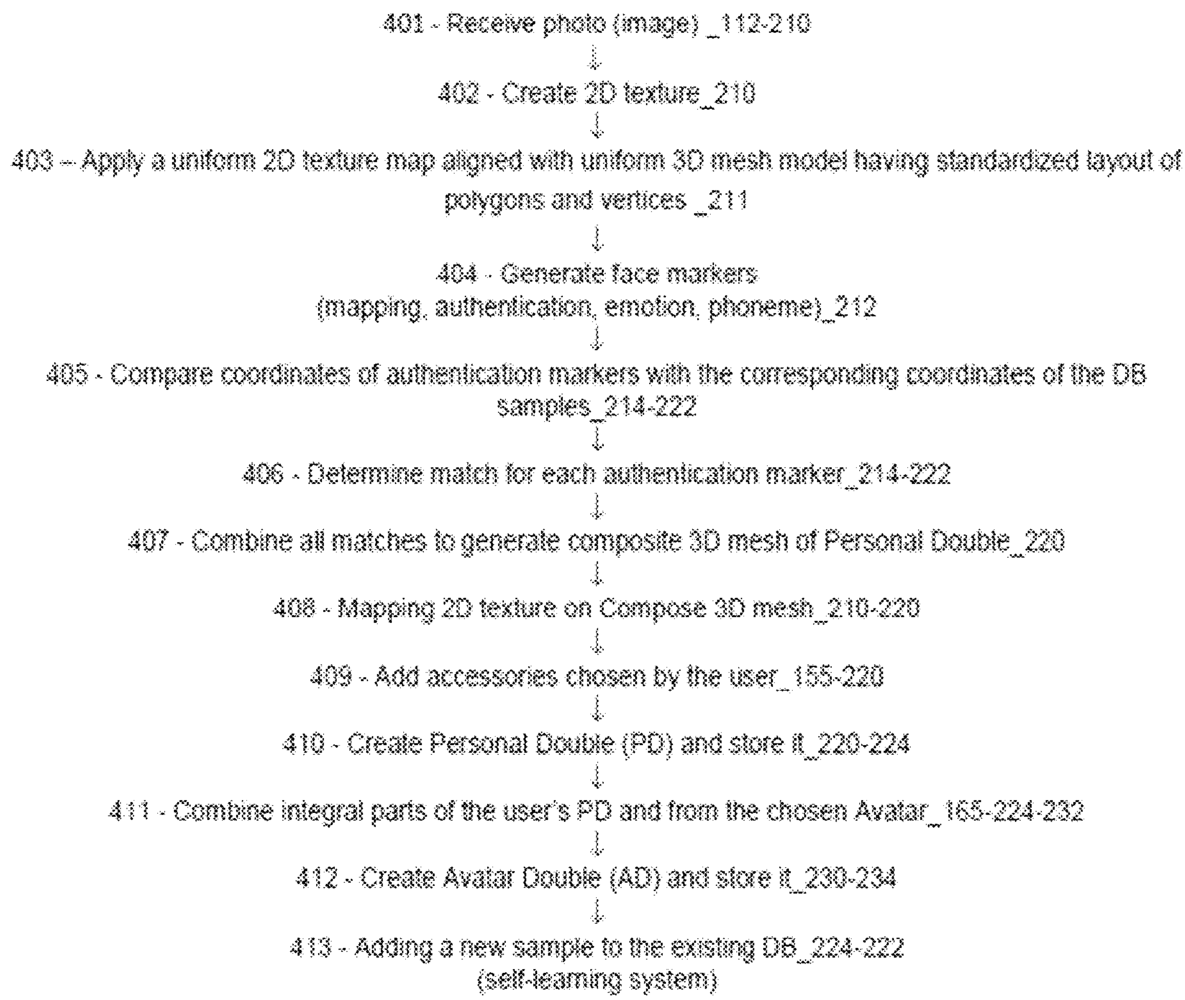
FIG. 37 is a flow diagram showing a sequence of operations of the process of creating personal doubles and avatar doubles on the server, as also shown in FIG. 33, according to an embodiment.

Based on the foregoing, the exemplary embodiments provide a method for incorporating emotional and contextual visualization into an electronic communication. FIG. 37 is a flow diagram showing a sequence of operations of the process of creating personal doubles and avatar doubles on the server, as also shown in FIG. 33, according to an embodiment. In one embodiment, module 211 creates a uniform three-dimensional model of a human face that comprises a fixed number of polygons and vertices having a standardized layout. Module 211 further creates a uniform two-dimensional texture map of the human face where each part is aligned with the corresponding parts of the uniform three-dimensional model.

In one embodiment, converter 210 receives, from camera 110 or other component of sender device 100, one or more images depicting a user's face (block 401). In one embodiment, converter 210 creates a two-dimensional (2D) texture map of the user's face from a series of photos, such as the one or more received images (block 402). FIG. 15, for example, shows predefined pixels in the 2D texture map at a given U, V coordinate, which can be aligned to corresponding vertices at given X, Y, Z coordinates in a 3D mesh model.

In one embodiment, module 211 creates a 2D texture map of the user's face from the received images and based on the uniform two-dimensional texture map (block 403). FIG. 13, for example, illustrates that each 3D mesh face model comprises a standardized number of similar polygons and corresponding vertices. In one embodiment, the 2D texture map is aligned with the corresponding 3D mesh model (each vertex in any polygon of the 3D mesh is assigned to one UV coordinate of the 2D texture map), as shown in FIG. 15.

In one embodiment, marker generator 212 generates a plurality of face markers corresponding to the user's face (block 404). The markers may include, for example, mapping markers 2122 (see FIG. 16), authentication markers 2124 (see FIG. 17), emotion markers 2126 (see FIGS. 18 and 21), and/or phoneme markers 2128 (see FIGS. 19 and 22). In one embodiment, for each marker in at least a subset of the plurality of markers (e.g., authentication markers 2124, AGM comparison module 214 compares the marker to a corresponding marker on each of a plurality of sample models to identify a matching marker from one of the plurality of sample models (block 405). For example, AGM comparison module 214 may compare integral parts of the sender's uniform 2D texture map, for the neutral face, with the corresponding integral parts of the 2D texture maps of neutral face samples from the reference database 222 DB of human neutral faces and detecting the closest 2D matches (see FIGS. 23A & 23B), while each of those is aligned with the corresponding integral part of the closest 3D match which is the 3D mesh model of the same sample from the reference database of human neutral faces—(block 406). In one embodiment, the reference database 222 DB includes samples of human faces (including neutral) presented by uniform 3D polygonal mesh models and uniform 2D textures (see FIG. 20) In addition, each sample in the database 222 DB may represent a single emotion from the set of predefined emotions, or a single phoneme from the set of predefined phonemes. Furthermore, a reference avatar database 232 DB may include neutral masks/faces presented by uniform 3D polygonal mesh models and uniform 2D textures. In one embodiment, each sample in the reference avatar database 232 DB may represent a single emotion from the set of predefined emotions, or a single phoneme from the set of predefined phonemes.

In one embodiment, composite personal double generator 220 determines an aligned part of a corresponding 3D mesh model and combines the aligned part of each corresponding 3D mesh model to generate a composite 3D mesh model of the user's face (block 407). This composite photorealistic 3D mesh model of the user face may be called a Personal Double, in short PD. In one embodiment, converter 210 maps the 2D texture on the newly created PD (block 408). FIG. 24 is a diagram illustrating the process for assembling the sender's personal double. In one embodiment, user accessories module 155 receives user input defining one or more accessories and applies the accessories chosen by the user to the personal double (block 409). Having received the accessories from module 155, module 220 creates a complete PD unit and stores the PD unit in personal double database 224 DB (block 410).

In one embodiment, hybrid avatar designer 165 creates a hybrid of the personal double (PD), for the neutral face, and an avatar 3D mesh model, for the neutral mask-face, by replacing the sender PD integral parts with the corresponding parts in avatar mesh model, and this hybrid 3D mesh model is called Avatar Double, or in short AD. In one embodiment, hybrid avatar designer 165 receives user input comprising one or more parts of the selected user avatar and combines the one or more parts with the personal double (block 411). Thus, composite avatar double generator 230 creates the avatar double and stores it in avatar double database 234 DB (block 412). FIGS. 3 and 4 illustrates the process for creating a hybrid avatar double by composing integral parts from the user's PD with various integral parts of the avatar templates.

In one embodiment, the newly created PD sample from 224 DB or 234 DB is added to the existing database 222 DB (block 413). By adding every new composite three-dimensional mesh model to the existing database, self-learning system is created, which becomes more effective with every new sample. This method allows the system to build more and more precise composite PDs over time.

Figure 34:
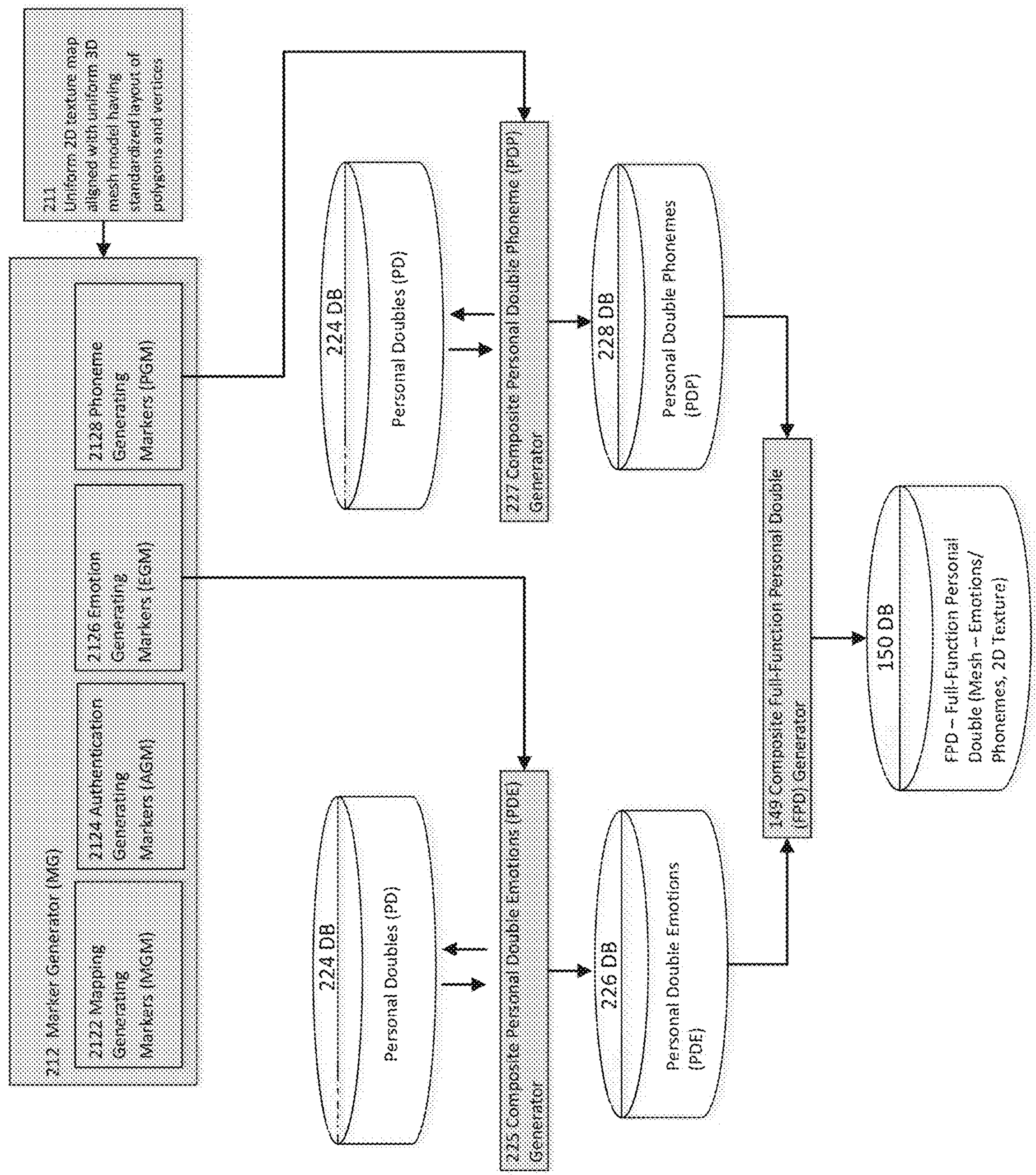
FIG. 34 is a system diagram illustrating process of creating full-function personal doubles on the server, according to an embodiment.
Figure 38:
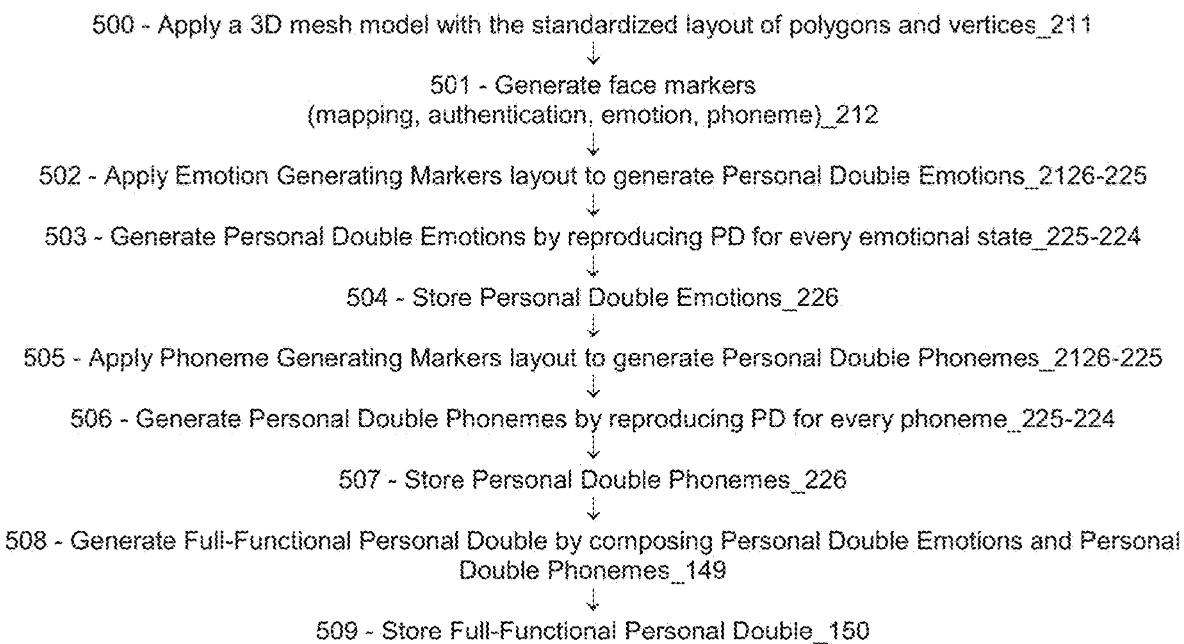
FIG. 38 is a flow diagram showing a sequence of operations of the process of creating full-function personal doubles on the server, as also shown in FIG. 34, according to an embodiment.

FIG. 38 is a flow diagram showing a sequence of operations of the process of creating full-function personal doubles on the server, as also shown in FIG. 34, according to an embodiment. In one embodiment, marker generator 212 applies a uniform structure of a 3D mesh model of a human face 211 consisting of a standardized number of similar polygons (and corresponding vertices) (block 500). Applying the 3D mesh model, as described above, with respect to FIG. 37, may result in the creation of a composite personal double representing the user's face. In one embodiment, marker generator 212 generates or identifies a plurality of face markers corresponding to the user's face (block 501). The markers may include, for example, mapping markers 2122 (see FIG. 16), authentication markers 2124 (see FIG. 17), emotion markers 2126 (see FIGS. 18 and 21), and/or phoneme markers 2128 (see FIGS. 19 and 22).

For each emotion of a plurality of emotions in a predefined set of emotions, composite personal double emotion (PDE) generator 225 modifies the composite personal double using the emotion markers 2126 to generate an emotion personal double. For example, PDE generator 225 may apply emotion generating markers 2126 to generate Personal Double Emotions (block 502). In one embodiment, PDE generator 225 creates, for each PD, a separate database 226 DB consisting of composite 3D mesh models where each of those presents one emotion from the predefined set, and each 3D mesh model is a composition of respective integral parts of the closest 3D matches of the same emotion for the given PD (block 503). In one embodiment, PDE generator 225 stores a copy of this database 226 DB on sender device 100, receiver device 300 and on a server 200 (block 504).

For each phoneme of a plurality of phonemes in a predefined set of phonemes, composite personal double phoneme (PDP) generator 227 modifies the composite personal double using the phoneme markers 2128 to generate a phoneme personal double. For example, PDP generator 227 may apply phoneme generating markers 2128 to generate Personal Double Phonemes (block 505). In one embodiment, PDP generator 227 creates, for each PD, a separate database 228 DB consisting of composite 3D mesh models where each of those presents one phoneme from the predefined set, and each 3D mesh model is a composition of respective integral parts of the closest 3D matches of the same phoneme for the given PD (block 506). In one embodiment, PDP generator 227 stores a copy of this database 228 DB on sender device 100, receiver device 300 and on a server 200 (block 507).

In one embodiment, composite full-function personal double (FPD) generator 149 combines at least one emotional personal double with at least one phoneme personal double to generate a Full-functional Personal Double (block 508). For example, FPD generator 149 may compose Personal Double Emotions from 226 DB and Personal Double Phonemes from 228 DB and store the resulting database 150 DB on sender device 100, receiver device 300 and on a server 200 (e.g., as 150 DB_1 or 150 DB_K in Sender_1 DB 340 or Sender_K DB 350) (block 509).

Figure 35:
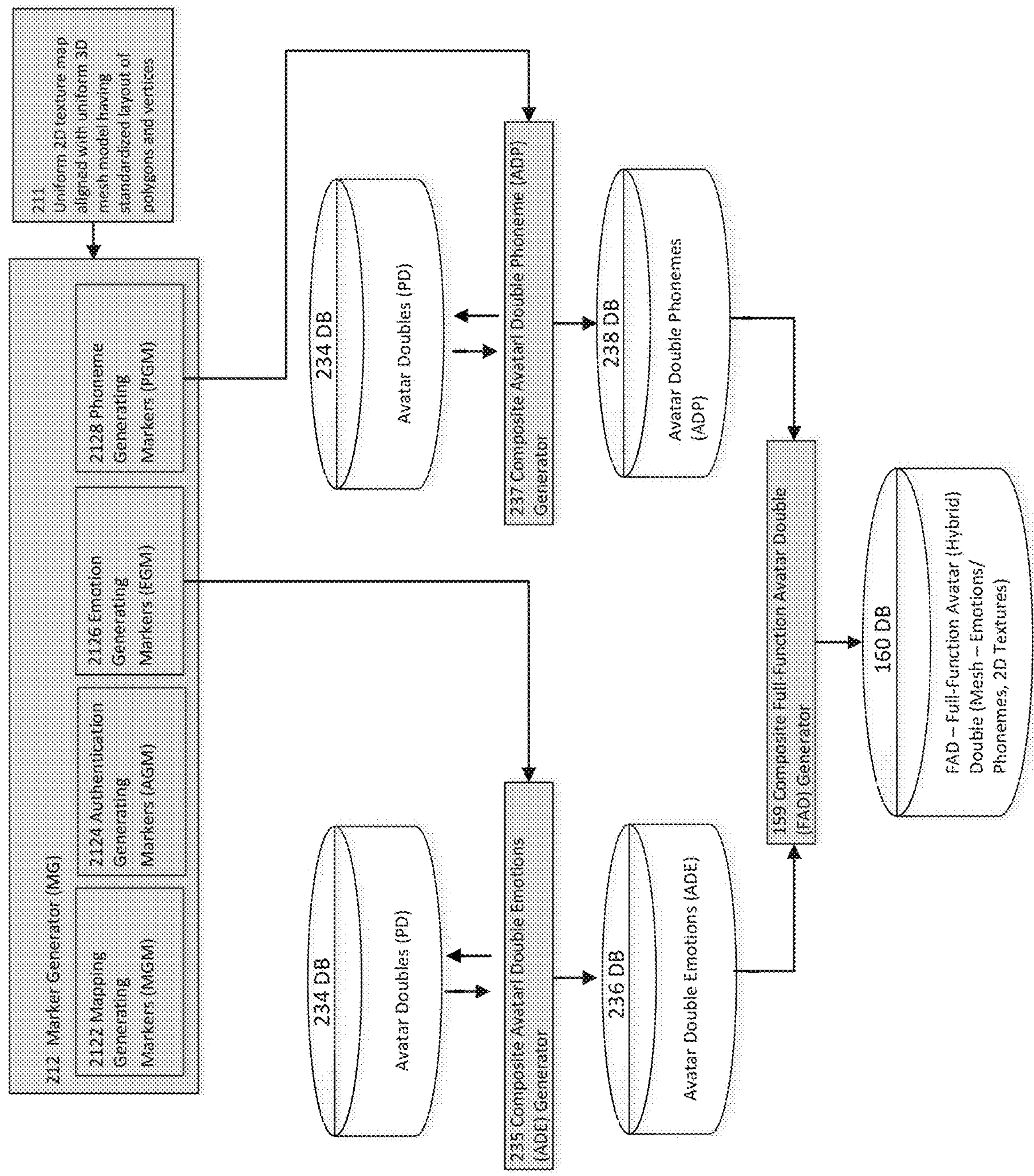
FIG. 35 is a system diagram illustrating process of creating full-function avatar doubles on the server, according to an embodiment.
Figure 39:
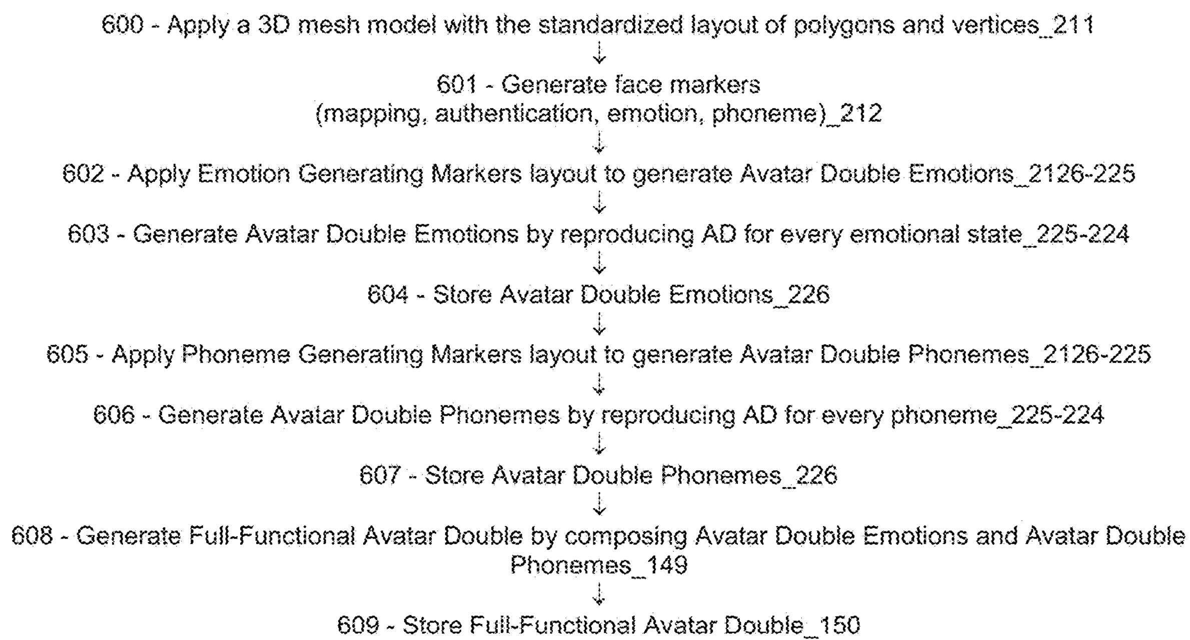
FIG. 39 is a flow diagram showing a sequence of operations of the process of creating full-function avatar doubles on the server, as also shown in FIG. 35, according to an embodiment.

FIG. 39 is a flow diagram showing a sequence of operations of the process of creating full-function avatar doubles on the server, as also shown in FIG. 35, according to an embodiment. In one embodiment, marker generator 212 applies a uniform structure of a 3D mesh model of a human face 211 consisting of a standardized number of similar polygons (and corresponding vertices) (block 600). Applying the 3D mesh model, as described above, with respect to FIG. 37, may result in the creation of a composite avatar double representing the user's face. In one embodiment, marker generator 212 generates or identifies a plurality of face markers corresponding to the user's face (block 601). The markers may include, for example, mapping markers 2122 (see FIG. 16), authentication markers 2124 (see FIG. 17), emotion markers 2126 (see FIGS. 18 and 21), and/or phoneme markers 2128 (see FIGS. 19 and 22).

For each emotion of a plurality of emotions in a predefined set of emotions, composite avatar double emotion (ADE) generator 235 modifies the composite avatar double using the emotion markers 2126 to generate an emotion avatar double. For example, ADE generator 225 may apply emotion generating markers 2126 to generate Avatar Double Emotions (block 602). In one embodiment, ADE generator 225 creates, for each AD, a separate database 236 DB consisting of composite 3D mesh models where each of those presents one emotion from the predefined set, and each 3D mesh model is a composition of respective integral parts of the closest 3D matches of the same emotion for the given AD (block 603). In one embodiment, ADE generator 225 stores a copy of this database 236 DB on sender device 100, receiver device 300 and on a server 200 (block 604).

For each phoneme of a plurality of phonemes in a predefined set of phonemes, composite avatar double phoneme (ADP) generator 237 modifies the composite avatar double using the phoneme markers 2128 to generate a phoneme avatar double. For example, ADP generator 237 may apply phoneme generating markers 2128 to generate Avatar Double Phonemes (block 605). In one embodiment, ADP generator 237 creates, for each PD, a separate database 238 DB consisting of composite 3D mesh models where each of those presents one phoneme from the predefined set, and each 3D mesh model is a composition of respective integral parts of the closest 3D matches of the same phoneme for the given AD (block 606). In one embodiment, ADP generator 237 stores a copy of this database 238 DB on sender device 100, receiver device 300 and on a server 200 (block 607).

In one embodiment, composite full-function avatar double (FAD) generator 159 combines at least one emotional avatar double with at least one phoneme avatar double to generate a Full-functional Avatar Double (block 608). For example, FAD generator 159 may compose Avatar Double Emotions from 236 DB and Avatar Double Phonemes from 238 DB and store the resulting database 160 DB on sender device 100, receiver device 300 and on a server 200 (e.g., as 160 DB_1 or 160 DB_K in Sender_1 DB 340 or Sender_K DB 350) (block 609).

Figure 36:
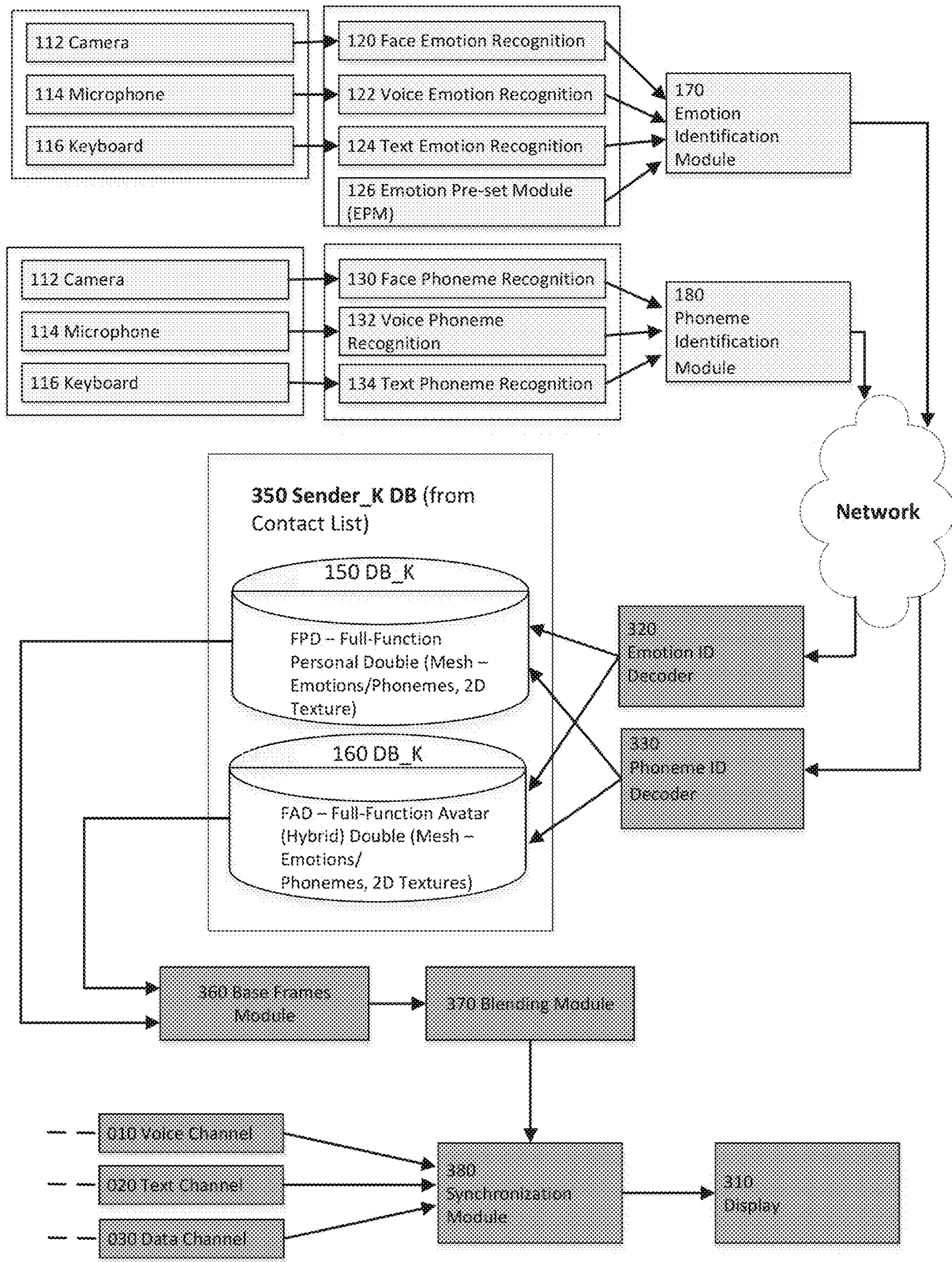
FIG. 36 is a system diagram illustrating process of creating, transmitting and synchronizing full-function visual imaging on the server, according to an embodiment.
Figure 40:
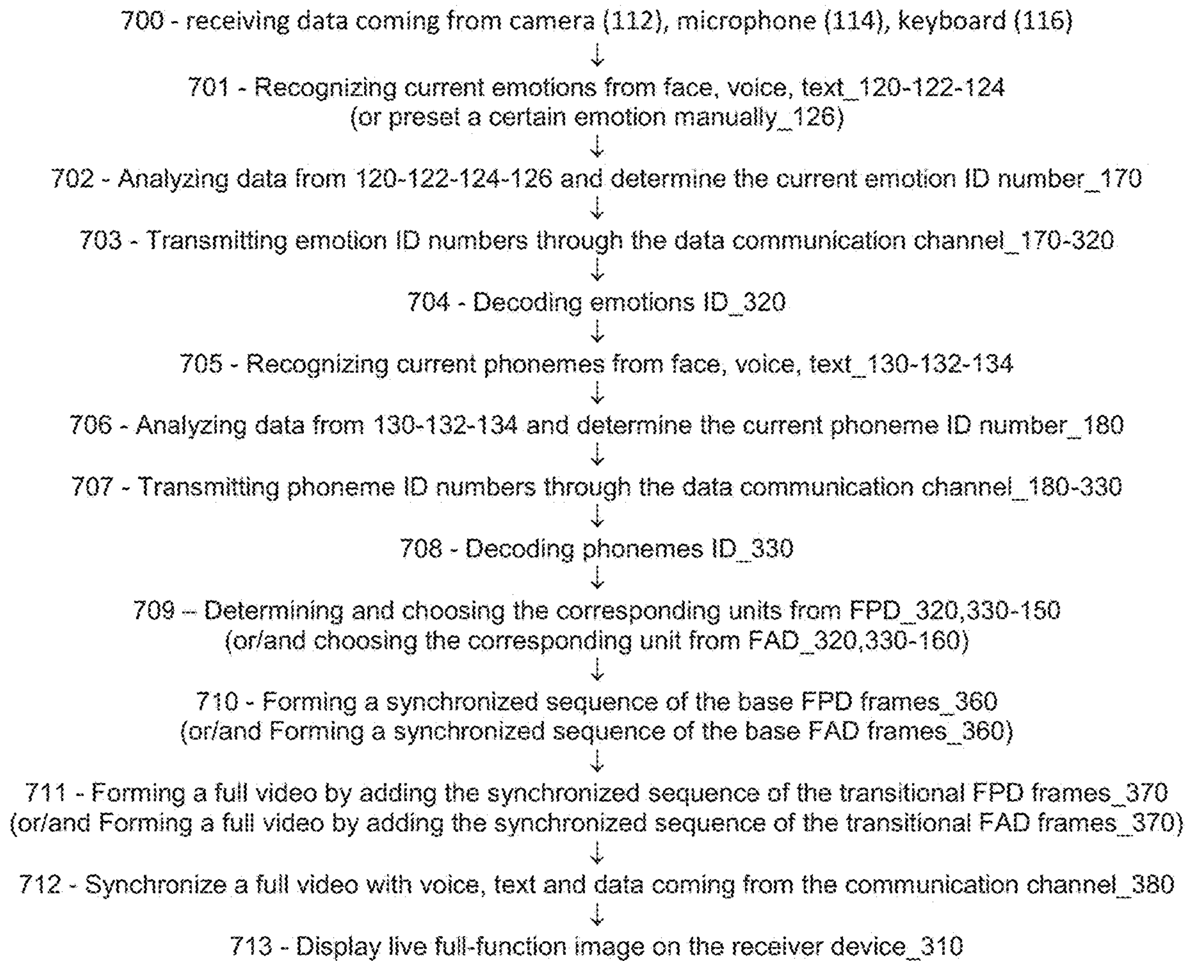
FIG. 40 is a flow diagram showing the sequence of operations of the process of creating, transmitting and synchronizing full-function visual imaging, as also shown in FIG. 36, according to an embodiment.

FIG. 40 is a flow diagram showing the sequence of operations of the process of creating, transmitting and synchronizing full-function visual imaging, as also shown in FIG. 36, according to an embodiment. In one embodiment, at least one of emotion identification module 170 or phoneme identification module 180 receives data coming from at least one of camera 112, microphone 114, or keyboard 116 (block 700). At least one of face emotion recognition module 120, voice emotion recognition module 122, text emotion recognition module, face phoneme recognition module 130, voice phoneme recognition module 132, or text phoneme recognition module 134 may have processed the received data to recognize current emotions from the face, voice, or text data (block 701). In one embodiment, the user presets a certain emotion manually via emotion pre-set module 126, Emotion identification module 170 may analyze the data coming from modules 120-126 to determine the current emotion ID number (block 702). In one embodiment, emotion identification module 170 transmits the perceived emotion ID number through a communication channel to receiver device 300 (block 703).

In one embodiment, receiver device 300 receives, from sender device 100, a message and the identifier of at least one emotion (emotion ID). In one embodiment, emotion ID decoder 320 decodes the emotion ID number on the receiving device 300 to determine the corresponding emotion (block 704).

At least one of face phoneme recognition module 130, voice phoneme recognition module 132, or text phoneme recognition module 134 may have processed the received data to recognize current phonemes from the face, voice, or text data (block 705). Phoneme identification module 180 may analyze the data coming from modules 130-134 to determine the current phoneme ID number (block 706). In one embodiment, phoneme identification module 180 transmits the perceived phoneme ID number through a communication channel to receiver device 300 (block 707).

In one embodiment, receiver device 300 receives, from sender device 100, the message and the identifier of at least one phoneme (phoneme ID). In one embodiment, phoneme ID decoder 330 decodes the emotion ID number on the receiving device 300 to determine the corresponding phoneme (block 708).

In one embodiment, at least one of emotion ID decoder 320 or phoneme ID decoder 330 identifies at least one full function personal double or a full function avatar double from database 150 DB_K or 160 DB_K corresponding to the decoded emotion ID and/or phoneme ID (block 709). In one embodiment, base frames module 360 forms a synchronized sequence of the base FPD or/and FAD frames (block 710). In one embodiment, blending module forms a full video by adding the synchronized sequence of the transitional frames FAD or/and FPD frames (block 711). In one embodiment, synchronization module 380 synchronizes a full video message with voice, text and data to generate a video comprising the full function personal double or full function avatar double presenting the received message (block 712). In one embodiment, display device 310 causes display of the live full-function video message on the receiving device 300 (block 713).

In one embodiment, the method may further include incorporating emotional and contextual visualization into everyday electronic communication. For example, during an electronic communication between a sending device 100 of the user and the receiving devise 300, the method includes determining an emotional state of the user and a pronouncing/texting phoneme through at least the user's voice or text or camera and transmitting the corresponding emotional identifier and phoneme identifier (emotion ID and phoneme ID) to the receiving device 300. The receiving device 300 may use the emotion ID and phoneme ID to retrieve corresponding 3D mesh model templates from the user's PD or AD databases at every sampling moment, then map corresponding personal, avatar or hybrid 2D textures, and use those images as sequence of key frames in the proposed animation. Using a blending process, the receiving device may create transitional images/frames between the key (base) frames to create a fully animated video message and display the fully animated video message on the receiving device 300 without requiring video data transmission via the communication channel.

Figure 41:
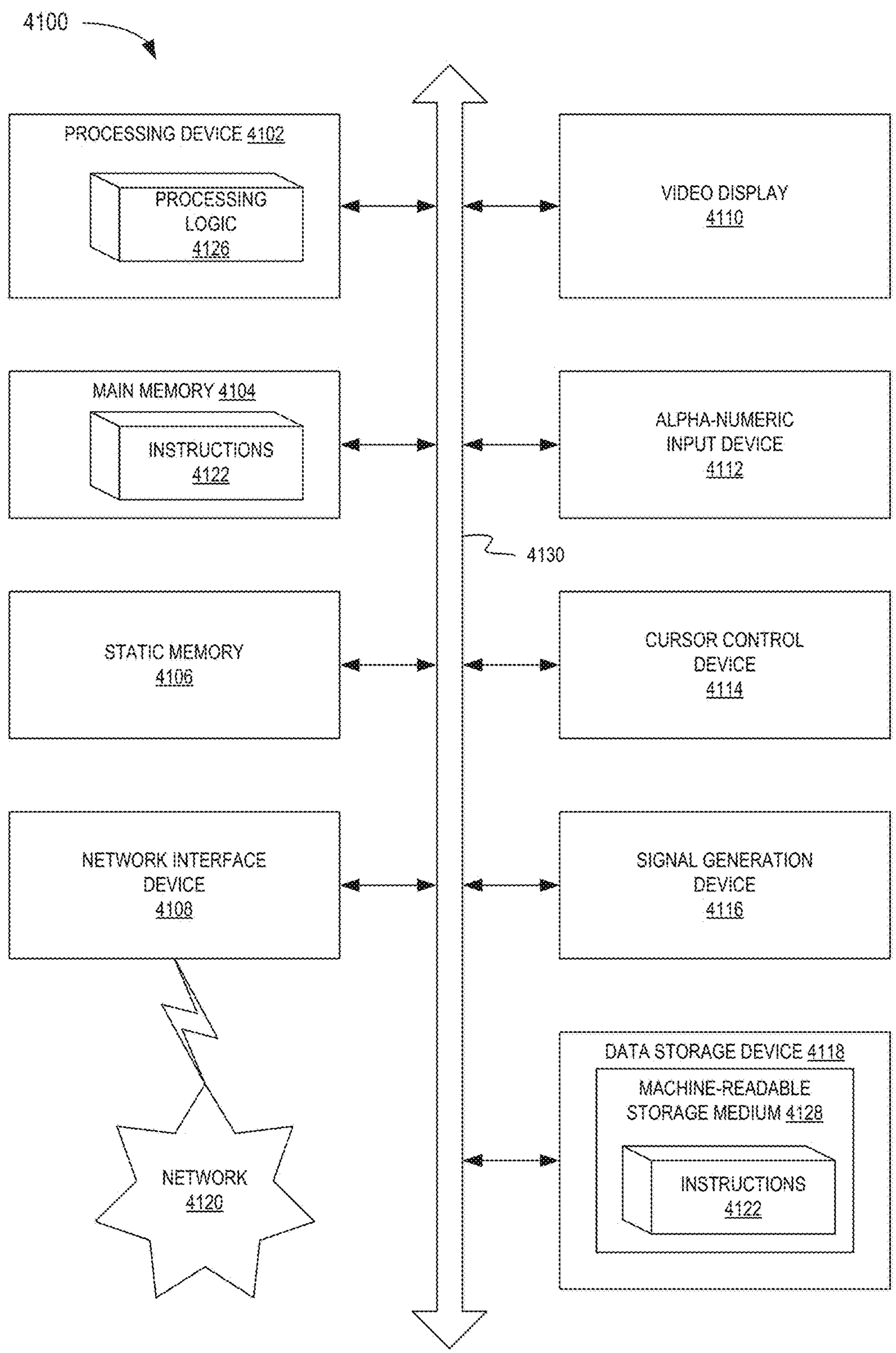
FIG. 41 is a block diagram illustrating one embodiment of a computer system, according to an embodiment.

FIG. 41 illustrates a diagrammatic representation of a machine in the exemplary form of a computer system 4100 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 4100 may be representative of a computing device, such as sender device 100, server 200 or receiver device 300.

The exemplary computer system 4100 includes a processing device 4102, a main memory 4104 (e.g., read-only memory (ROM), flash memory, dynamic random access memory (DRAM) (such as synchronous DRAM (SDRAM) or Rambus DRAM (RDRAM), etc.), a static memory 4106 (e.g., flash memory, static random access memory (SRAM), etc.), and a data storage device 4118, which communicate with each other via a bus 4130. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 4102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 4102 may also be one or more special-purpose processing devices such as an application specific integrated circuit (ASIC), a field programmable gate array (FPGA), a digital signal processor (DSP), network processor, or the like. The processing device 4102 is configured to execute processing logic 4126 for performing the operations and steps discussed herein.

The computer system 4100 may further include a network interface device 4108. The computer system 4100 also may include a video display unit 4110 (e.g., a liquid crystal display (LCD) or a cathode ray tube (CRT)), an alphanumeric input device 4112 (e.g., a keyboard), a cursor control device 4114 (e.g., a mouse), and a signal generation device 4116 (e.g., a speaker).

The data storage device 4118 may include a machine-accessible storage medium 4128, on which is stored one or more set of instructions 4122 (e.g., software) embodying any one or more of the methodologies of functions described herein. The instructions 4122 may also reside, completely or at least partially, within the main memory 4104 and/or within the processing device 4102 during execution thereof by the computer system 4100; the main memory 4104 and the processing device 4102 also constituting machine-accessible storage media. The instructions 4122 may further be transmitted or received over a network 4120 via the network interface device 4108.

The machine-readable storage medium 4128 may also be used to store instructions for incorporating contextual and emotional visualization into an electronic communication, as described herein. While the machine-readable storage medium 4128 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:

creating a uniform three-dimensional model of a human face that comprises a fixed number of polygons and vertices having a standardized layout;

creating a uniform two-dimensional texture map of the human face where each part is aligned with the corresponding parts of the uniform three-dimensional model;

receiving, from a first user device, one or more images depicting a user's face;

creating a two-dimensional texture map of the user's face from the one or more images based on the uniform two-dimensional texture map;

generating, from the two-dimensional texture map of the user's face, a plurality of authenticating markers corresponding to the user's face;

for each marker in at least a subset of the plurality of authenticating markers, comparing the marker to a corresponding marker on each of a plurality of two-dimensional texture maps of sample models to identify a matching marker from one of the sample models;

determining, for each of the matching markers, an aligned part of a corresponding three-dimensional mesh model from the sample models; and combining, by a processing device, the aligned part of each corresponding three-dimensional mesh model to generate a composite three-dimensional mesh model of the user's face.

2. The method of claim 1, further comprising:

applying the two-dimensional texture map of the user's face to the composite three-dimensional mesh model to generate a personal double of the user's face.

3. The method of claim 2, further comprising:

receiving user input defining one or more accessories; and applying the one or more accessories to the personal double.

4. The method of claim 2, further comprising:

receiving user input comprising of one or more parts of a selected user avatar; and combining the one or more parts of the selected user avatar with the personal double to generate an avatar double.

5. The method of claim 1, further comprising:

adding the composite three-dimensional mesh model to the plurality of sample models.

6. The method of claim 1, wherein the sample models comprise a reference database of user faces, wherein each sample model represents a face displaying at least one of a single emotion or a single phoneme from a set of predefined emotions and phonemes.

7. A non-transitory computer readable storage medium storing instructions that, when executed by a processing device, cause the processing device to:

create a uniform three-dimensional model of a human face that comprises a fixed number of polygons and vertices having a standardized layout;

create a uniform two-dimensional texture map of the human face where each part is aligned with the corresponding parts of the uniform three-dimensional model;

receive, from a first user device, one or more images depicting a user's face;

create a two-dimensional texture map of the user's face from the one or more images based on the uniform two-dimensional texture map;

generate, from the two-dimensional texture map of the user's face, a plurality of authenticating markers corresponding to the user's face;

for each marker in at least a subset of the plurality of authenticating markers, compare the marker to a corresponding marker on each of a plurality of two-dimensional texture maps of sample models to identify a matching marker from one of the sample models;

determine, for each of the matching markers, an aligned part of a corresponding three-dimensional mesh model from the sample models; and combine, by a processing device, the aligned part of each corresponding three-dimensional mesh model to generate a composite three-dimensional mesh model of the user's face.

8. The non-transitory computer readable storage medium of claim 7, wherein the instructions further cause the processing device to:

apply the two-dimensional texture map of the user's face to the composite three-dimensional mesh model to generate a personal double of the user's face.

9. The non-transitory computer readable storage medium of claim 8, wherein the instructions further cause the processing device to:

receive user input defining one or more accessories; and apply the one or more accessories to the personal double.

10. The non-transitory computer readable storage medium of claim 8, wherein the instructions further cause the processing device to:

receive user input comprising of one or more parts of a selected user avatar; and combine the one or more parts of the selected user avatar with the personal double to generate an avatar double.

11. The non-transitory computer readable storage medium of claim 7, wherein the instructions further cause the processing device to:

add the composite three-dimensional mesh model to the plurality of sample models.

12. The non-transitory computer readable storage medium of claim 7, wherein the sample models comprise a reference database of user faces, wherein each sample model represents a face displaying at least one of a single emotion or a single phoneme from a set of predefined emotions and phonemes.

13. A system comprising:

a memory; and a processing device coupled to the memory, wherein the processing device is configured to:

create a uniform three-dimensional model of a human face that comprises a fixed number of polygons and vertices having a standardized layout;

create a uniform two-dimensional texture map of the human face where each part is aligned with the corresponding parts of the uniform three-dimensional model;

receive, from a first user device, one or more images depicting a user's face;

create a two-dimensional texture map of the user's face from the one or more images based on the uniform two-dimensional texture map;

generate, from the two-dimensional texture map of the user's face, a plurality of authenticating markers corresponding to the user's face;

for each marker in at least a subset of the plurality of authenticating markers, compare the marker to a corresponding marker on each of a plurality of two-dimensional texture maps of sample models to identify a matching marker from one of the sample models;

determine, for each of the matching markers, an aligned part of a corresponding three-dimensional mesh model from the sample models; and combine, by a processing device, the aligned part of each corresponding three-dimensional mesh model to generate a composite three-dimensional mesh model of the user's face.

14. The system of claim 13, wherein the processing device is further configured to:

apply the two-dimensional texture map of the user's face to the composite three-dimensional mesh model to generate a personal double of the user's face.

15. The system of claim 14, wherein the processing device is further configured to:

receive user input defining one or more accessories; and apply the one or more accessories to the personal double.

16. The system of claim 14, wherein the processing device is further configured to:

receive user input comprising of one or more parts of a selected user avatar; and combine the one or more parts of the selected user avatar with the personal double to generate an avatar double.

17. The system of claim 13, wherein the processing device is further configured to:

add the composite three-dimensional mesh model to the plurality of sample models.

18. The system of claim 13, wherein the sample models comprise a reference database of user faces, wherein each sample model represents a face displaying at least one of a single emotion or a single phoneme from a set of predefined emotions and phonemes.

* * * * *